United States Patent
Otte

(10) Patent No.: US 12,292,987 B2
(45) Date of Patent: May 6, 2025

(54) METHODS AND SYSTEMS FOR PURPOSE-BASED ACCESS CONTROL

(71) Applicant: Cambia Health Solutions, Inc., Portland, OR (US)

(72) Inventor: Arnoud Otte, Portland, OR (US)

(73) Assignee: CAMBIA HEALTH SOLUTIONS, INC., Portland, OR (US)

( * ) Notice: Subject to any disclaimer, the term of this patent is extended or adjusted under 35 U.S.C. 154(b) by 713 days.

(21) Appl. No.: 17/194,071

(22) Filed: Mar. 5, 2021

(65) Prior Publication Data
US 2021/0279355 A1 Sep. 9, 2021

Related U.S. Application Data

(60) Provisional application No. 62/986,470, filed on Mar. 6, 2020.

(51) Int. Cl.
*G06F 21/62* (2013.01)

(52) U.S. Cl.
CPC .. *G06F 21/6218* (2013.01); *G06F 2221/2111* (2013.01); *G06F 2221/2137* (2013.01)

(58) Field of Classification Search
CPC ......... G06F 21/6218; G06F 2221/2111; G06F 2221/2137
USPC .......................................................... 726/28
See application file for complete search history.

(56) References Cited

U.S. PATENT DOCUMENTS

| | | | |
|---|---|---|---|
| 7,302,569 B2 * | 11/2007 | Betz ...................... | G06F 21/629 713/167 |
| 7,478,157 B2 * | 1/2009 | Bohrer ................... | G06Q 10/10 709/224 |
| 8,020,213 B2 | 9/2011 | Chen et al. | |
| 9,037,610 B2 * | 5/2015 | Rissanen ............. | G06F 16/9032 707/786 |
| 10,127,393 B2 | 11/2018 | Ferraiolo et al. | |
| 10,990,689 B1 * | 4/2021 | Reiner ................... | G06F 21/604 |
| 11,106,813 B2 * | 8/2021 | Gkoulalas-Divanis ...................... | G06F 21/6218 |
| 11,380,429 B1 * | 7/2022 | Suther ....................... | G06F 8/61 |
| 11,443,056 B2 * | 9/2022 | Gkoulalas-Divanis ...................... | G06F 21/602 |
| 2008/0034439 A1 * | 2/2008 | Chen ..................... | H04L 63/105 726/27 |

(Continued)

FOREIGN PATENT DOCUMENTS

CN 105787386 A 7/2016

OTHER PUBLICATIONS

Byun, J. et al., "Purpose Based Access Control for Privacy Protection in Relational Database Systems," Proceedings of the International Conference on Database Systems for Advanced Applications (DASFAA 2005), Apr. 17, 2005, Beijing, China, 16 pages.

(Continued)

*Primary Examiner* — Dereena T Cattungal
(74) *Attorney, Agent, or Firm* — McCoy Russell LLP

(57) ABSTRACT

Systems and methods for purpose-based access control are provided. In one embodiment, a method for determining access to an asset comprises receiving, from a user, an access request for the asset, the access request specifying a purpose for accessing the asset, and authorizing access to the asset if the purpose is approvingly linked to the asset. In this way, unrestricted collaboration across an organization may be allowed without risking inappropriate disclosure.

15 Claims, 14 Drawing Sheets

(56) References Cited

U.S. PATENT DOCUMENTS

| | | | |
|---|---|---|---|
| 2008/0168529 A1* | 7/2008 | Anderson | G06F 21/577 726/1 |
| 2009/0198697 A1* | 8/2009 | Bilger | G06F 21/6227 707/999.009 |
| 2009/0205018 A1* | 8/2009 | Ferraiolo | H04L 63/102 707/999.103 |
| 2009/0328138 A1* | 12/2009 | Lee | G06Q 10/10 726/1 |
| 2014/0096261 A1* | 4/2014 | Boldyrev | G06F 21/00 726/26 |
| 2015/0242570 A1* | 8/2015 | Li | G16H 10/60 705/3 |
| 2016/0203181 A1 | 7/2016 | Verma et al. | |
| 2017/0091279 A1* | 3/2017 | Shah | G06F 21/6218 |
| 2017/0091658 A1* | 3/2017 | Matthiesen | H04L 63/102 |
| 2018/0157858 A1* | 6/2018 | Attfield | H04W 4/70 |
| 2021/0089678 A1* | 3/2021 | Gkoulalas-Divanis | G06F 21/6218 |
| 2022/0067199 A1* | 3/2022 | Taber | G06F 9/3836 |

OTHER PUBLICATIONS

Hung, P., "Towards a Privacy Access Control Model for e-Healthcare Services," Proceedings of the Third Annual Conference on Privacy, Security and Trust, Oct. 12, 2005, St. Andrews, New Brunswick, Canada, 4 pages.

Tahir, M., "C-RBAC: Contextual Role-Based Access Control Model," Ubiquitous Computing and Communication Journal, vol. 2, No. 3, Available as Early as Jan. 2007, 8 pages.

Yang, N. et al., "A Purpose-Based Access Control Model," Journal of Information Assurance and Security, vol. 1, CiteSeerX Website, Available Online at http://citeseerx.ist.psu.edu/viewdoc/download?doi=10.1.1.518.7092&rep=rep1&type=pdf, Available as Early as Jan. 2008, 8 pages.

Masoumzadeh, A. et al., "PuRBAC: Purpose-Aware Role-Based Access Control," Proceedings of the OTM 2008 Confederated International Conferences—On the Move to Meaningful Internet Systems: OTM 2008, Nov. 9, 2008, Monterrey, Mexico, 18 pages.

Kabir, M. et al., "Conditional Purpose Based Access Control Model for Privacy Protection," Proceedings of the Twentieth Australasian Conference on Astralasian Database, vol. 92, Jan. 2009, 8 pages.

"Automate data governance—Self-Service Data Access with Automated Privacy Control," IMMUTA Website, Available Online at https://www.immuta.com/, Available as Early as Jun. 3, 2013, 5 pages.

Kabir, M. et al., "A Role-involved Conditional Purpose-based Access Control Model," HAL Archives Website, Available Online at https://hal.inria.fr/hal-01054641/document, Aug. 7, 2014, 15 pages.

Ferraiolo, D. et al., "Policy Machine: Features, Architecture, and Specification," NIST Publications, 7987 Rev 1, Oct. 17, 2015, 126 pages.

Ferraiolo, D. et al., "A Comparison of Attribute Based Access Control (ABAC) Standards for Data Service Applications," NIST Special Publications, SP 800-178, Oct. 2016, 68 pages.

* cited by examiner

METHODS AND SYSTEMS FOR PURPOSE-BASED ACCESS CONTROL

CROSS REFERENCE TO RELATED APPLICATIONS

The present application claims priority to U.S. Provisional Application No. 62/986,470, entitled "METHODS AND SYSTEMS FOR PURPOSE-BASED ACCESS CONTROL", and filed on Mar. 6, 2020. The entire contents of the above-listed application are hereby incorporated by reference for all purposes.

BACKGROUND AND SUMMARY

Numerous data breaches at organizations ranging from regulated (e.g., health insurance providers, government institutions) to unregulated (e.g., software companies, retail companies, and so on) have been reported in recent years. The reasons for smaller breaches tend to be accidental due to the manual handling of security controls, while the larger breaches are criminal endeavors, commonly using phishing for credentials of privileged users.

One approach to reducing the risk of both accidental and intentional causes of breaches includes automating fine-grained access control to remove unnecessary access to sensitive assets from common business activities. The number of access requests to sensitive data increase with the heightened focus on personalization, opt-in/opt-out preferences and consent management. As a result, not only has the risk of disclosing sensitive data increased, the desired utilization of sensitive data is also increasing as are the volume levels at which this is all to be maintained.

The inventors have recognized the above issues and have devised several approaches to address them. In particular, systems and methods for purpose-based access control are provided. In one embodiment, a method for determining access to an asset comprises receiving, from an actor, an access request for the asset, the access request specifying a purpose for accessing the asset, and authorizing access to the asset if the purpose is approvingly linked to the asset. In this way, access may be tied to business actions, access rights may be re-assessed in real-time in support of rapidly changing rules, unrestricted collaboration across an organization may be allowed without risking inappropriate disclosure, and access rights may be easily modified and controlled at arbitrarily large scales. Further, access rights may be easily managed according to environmental constraints, such as spatial and temporal constraints.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The present description relates to systems and methods of purpose-based access control. In particular, systems and methods for granting or denying access to assets according to purposes for accessing said assets are provided. Such systems and methods allow access to assets to be tied to business actions, for example, and enable the real-time re-assessment of access rights in support of rapidly changing rules, such as consumer consent. A computing environment, such as the computing environment depicted in FIG. 1, may include a server that mediates access to resources stored in one or more databases. Specifically, the server may be configured with an access control module, as depicted in FIG. 2, which evaluates an action request submitted by a user to access one or more assets for a specific purpose. An action can be anything an organization considers a user could do to the asset and which needs to be managed. Common examples are "create", "read", "update", and "delete" (CRUD), but could also be "execute". An asset can be anything the organization wants to manage access to. Commonly assets are data assets, such as columns, tables, schemas, databases, files, directories, systems, or end points, such as Web Application Programming Interfaces (APIs), but more abstract assets, such as constraints can also be used to manage row or data instance level access, such as sensitive conditions in healthcare data. One powerful scheme for controlling access to resources that enables fine-grained access control is known as Next Generation Access Control (NGAC). To control access to the resources, the access control module may include a Next Generation Access Control (NGAC) engine, such as the NGAC engine depicted in FIG. 3.

Figure 7:
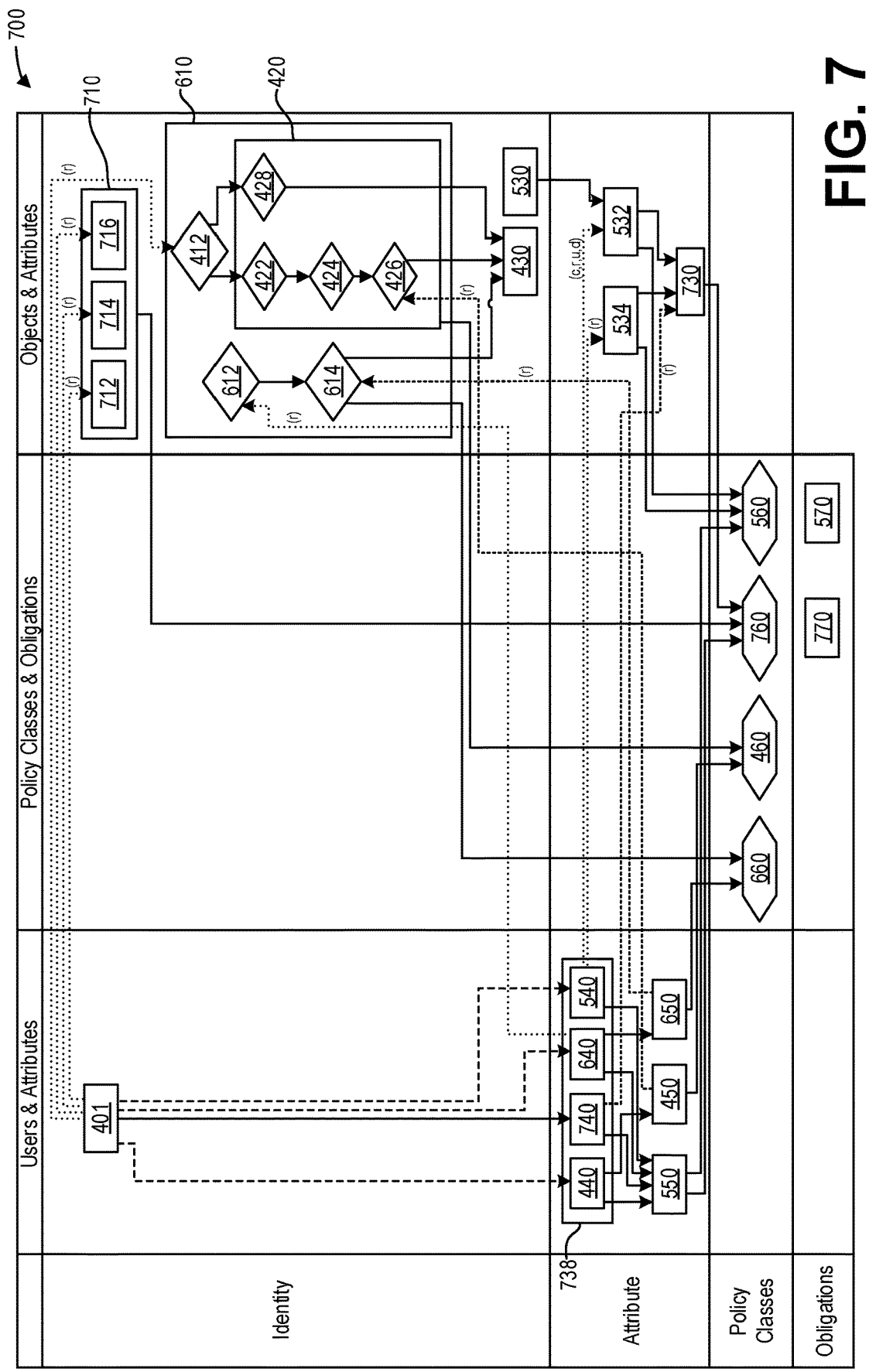
FIG. 7 shows a high-level diagram illustrating an example of access control with purpose-based access control according to an embodiment.
Figure 8:
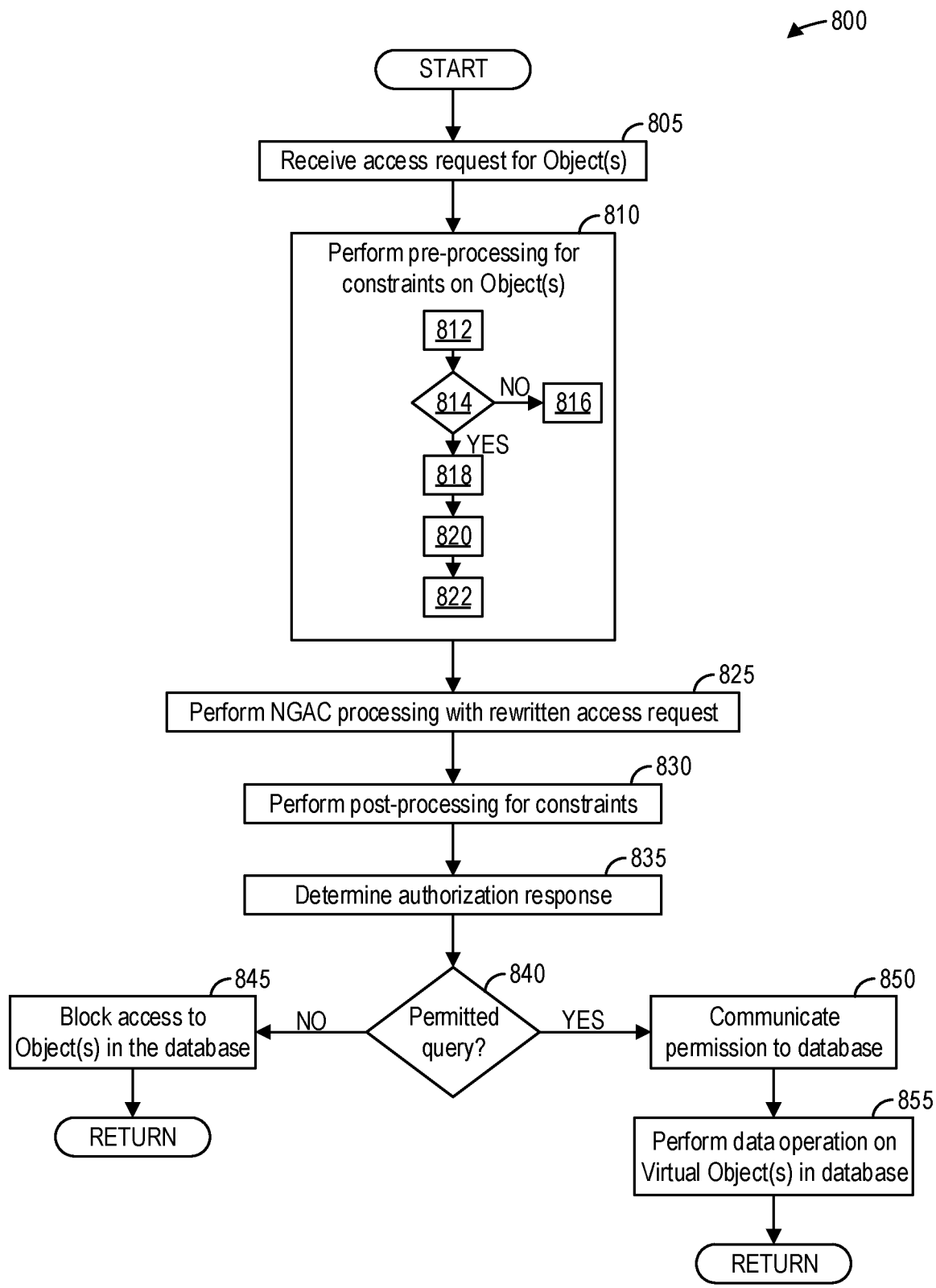
FIG. 8 shows a high-level flow chart illustrating an example method for access control with constraints for implementing a legal instrument according to an embodiment.
Figure 10:
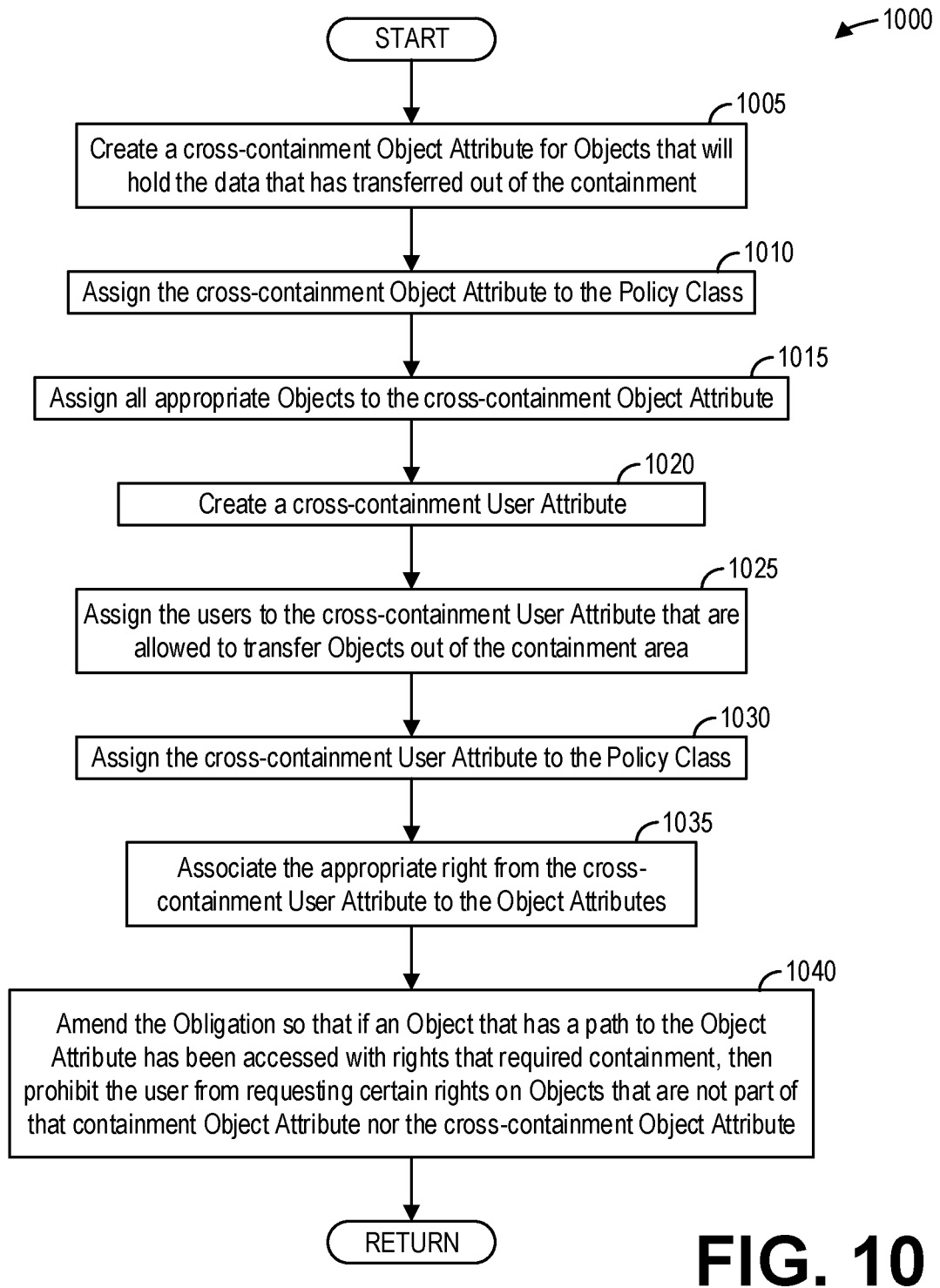
FIG. 10 shows a high-level flow chart illustrating an example method for controlling cross-containment transfer with access control according to an embodiment.
Figure 11:
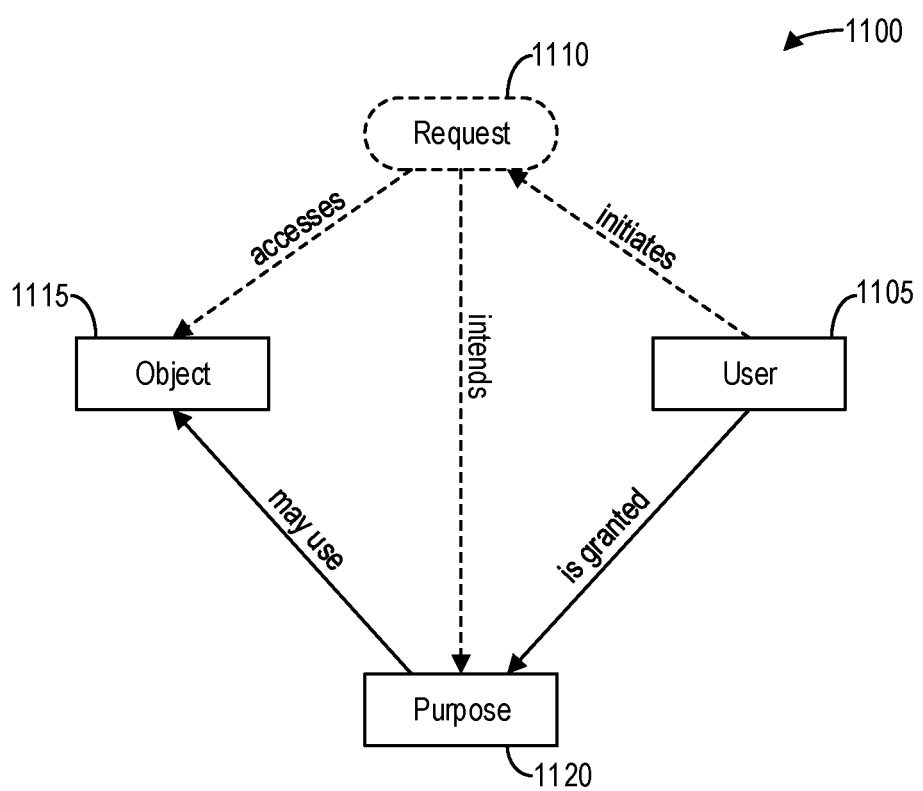
FIG. 11 shows a high-level diagram illustrating example assignments and actions for instrument-based access control according to an embodiment.
Figure 12:
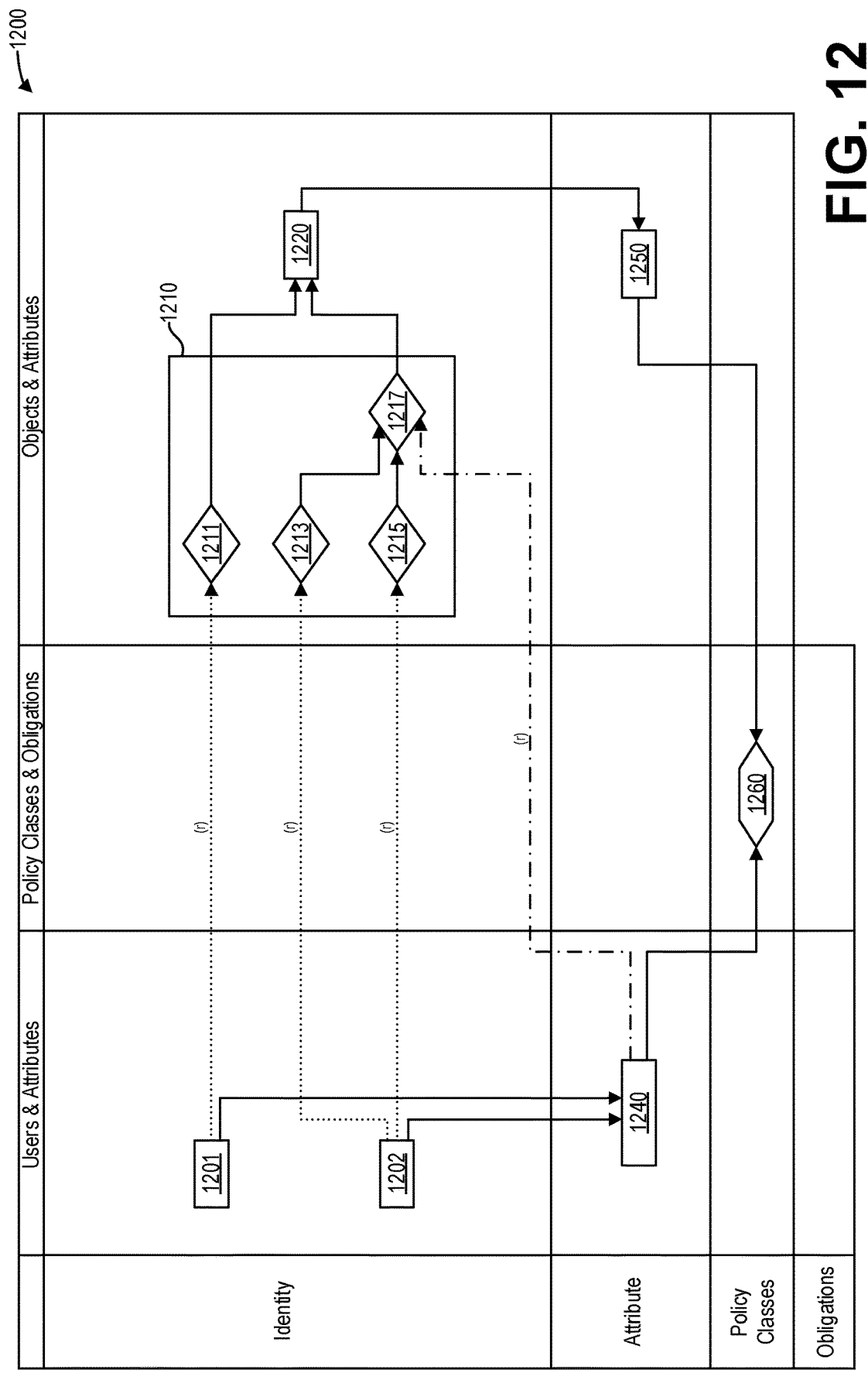
FIG. 12 shows a high-level diagram illustrating an example of access control for multiple users with a constraint module according to an embodiment.
Figure 13:
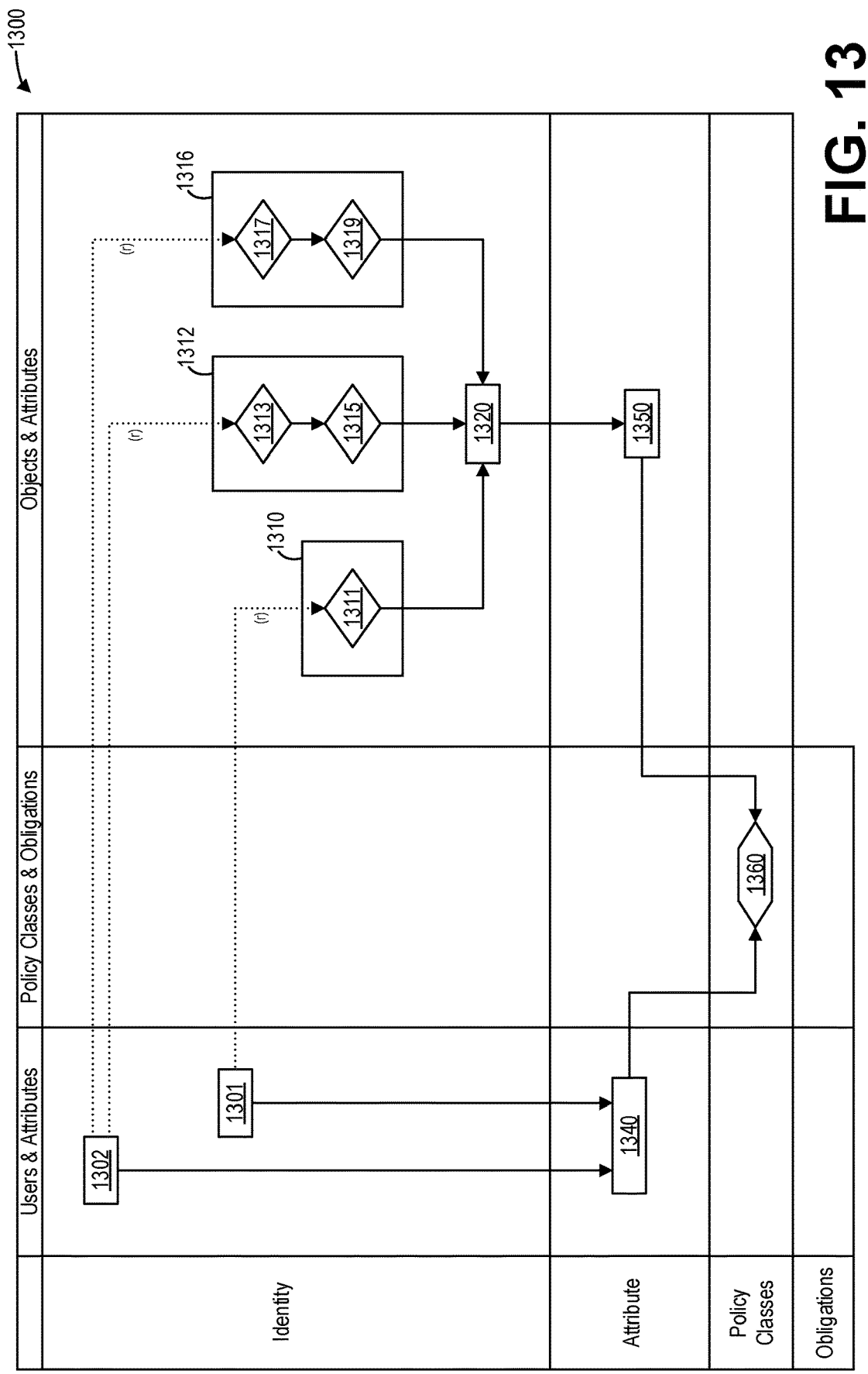
FIG. 13 shows a high-level diagram illustrating an example of access control for multiple users only with next generation access control according to an embodiment.
Figure 14:
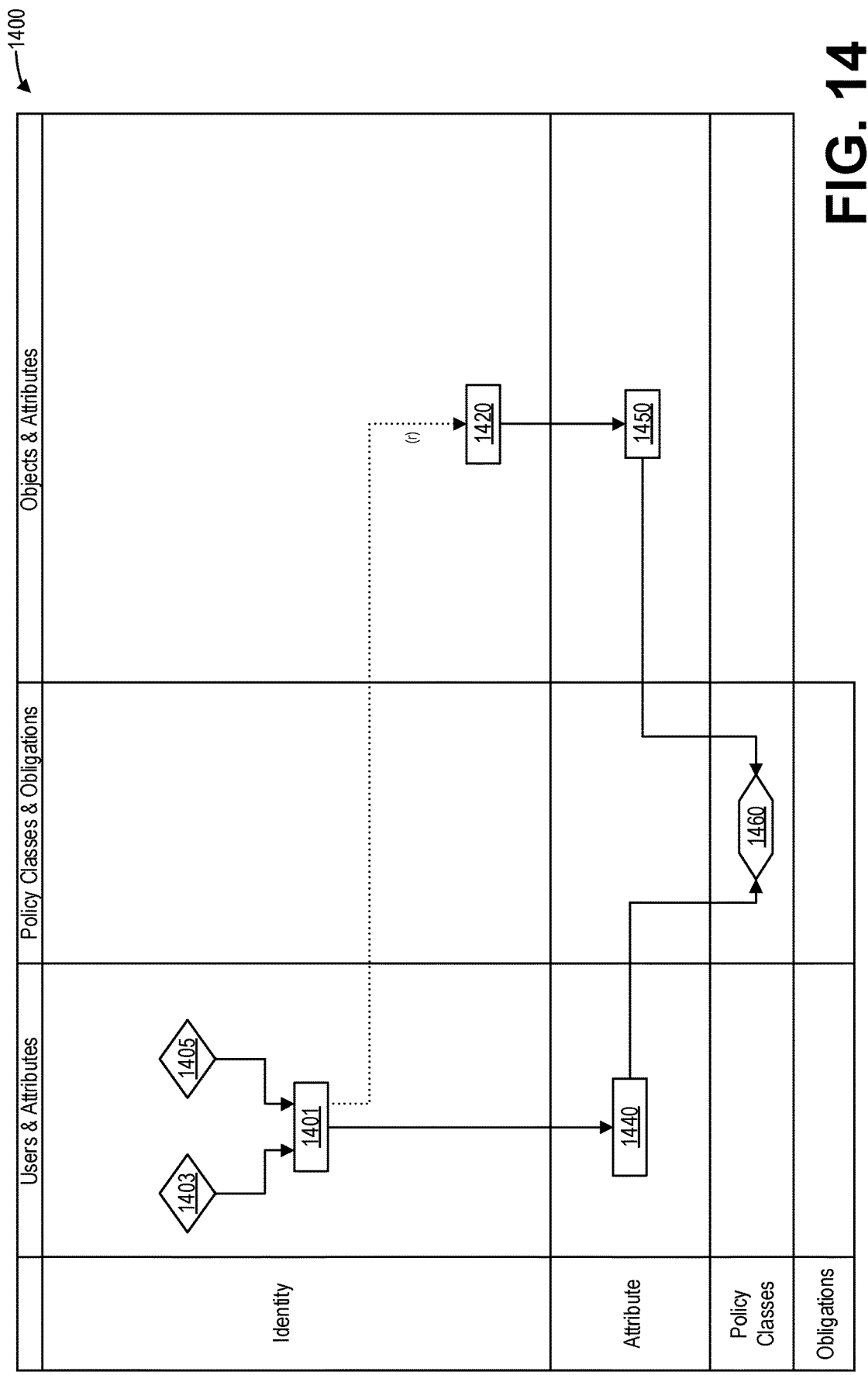
FIG. 14 shows a high-level diagram illustrating an example of access control with virtual users according to an embodiment.

However, NGAC does not support the implementation of legal instruments, such as federal, state, and local laws, contracts, terms of use, privacy policies, and individual consents, in a manner that may be easily adjusted and managed. The grain of control required commonly resides below the level that resources can manage their authorizations on a per-user level. Instruments define the scope of applicability of permission or restriction by specifying How, Who, What, Where, When, and Why for accessing assets or resources. While modern access control schemes such as NGAC are relatively powerful, they fail to provide purpose-based or "Why" access control, as well as environmental controls (e.g., Where and When). Instrument-based access control (IBAC) as proposed herein provides an extension of NGAC that addresses such gaps and increases the manageability of access control. For example, as depicted by the various implementations of access control shown in FIGS. 4-7, various elements of legal instruments may be implemented as constraints, policy classes, user attributes, and object attributes. With this approach, evaluating an access request to an object or asset, as depicted in FIG. 8, includes pre-processing the access request to consider constraints imposed by one or more legal instruments on accessing the object. In the case of partial access being allowable, virtual objects may be generated according to such constraints and the user may be granted access to the virtual object instead of the object directly. In this way, fine-grained access control may be implemented without the need to manage associations directly between users and resources. Furthermore, methods for access control, such as the methods depicted in FIGS. 9 and 10, easily allow the regulation of access with regard to geographic location or other considerations for containment. The specification of a purpose, as depicted in FIG. 11, further extends the high-level management of access control. The use of constraints substantially reduces the redundancy in managing associations and assignments, as depicted in FIGS. 12 and 13, for multiple users. For example, when implementing the examples of access control with and without a constraint model depicted in FIGS. 12 and 13, respectively, for an implementation with 100,000 users, the access control without a constraint model depicted in FIG. 13 results in almost 500,000 duplicate items that need to be maintained. As another example, considering a constraint model including a user constraint and four additional constraints, implementing access control for 100 users and 100 objects with a constraint model including a user constraint and four additional constraints would utilize 104 constraints, 400 assignments, and 100 associations, whereas implementing a same level of access control without a constraint model would require 10,000 virtual objects, 10,000 assignments, and 10,000 associations. Thus, the systems and methods for access control provided herein substantially improve the manageability of access control for a plurality of users. It should be appreciated that many advantages result from reducing the complexity of managing or administering access control in this way, including reducing time spent managing access, increasing processing efficiency, and reducing administrative errors. The technical problem of administering fine-grain access control between a plurality of users and a plurality of data objects is thus solved by the technical solution of the constraint model as described herein. User-side constraints, as depicted in FIG. 14, further allow for environmental conditions to be applied.

Figure 1:
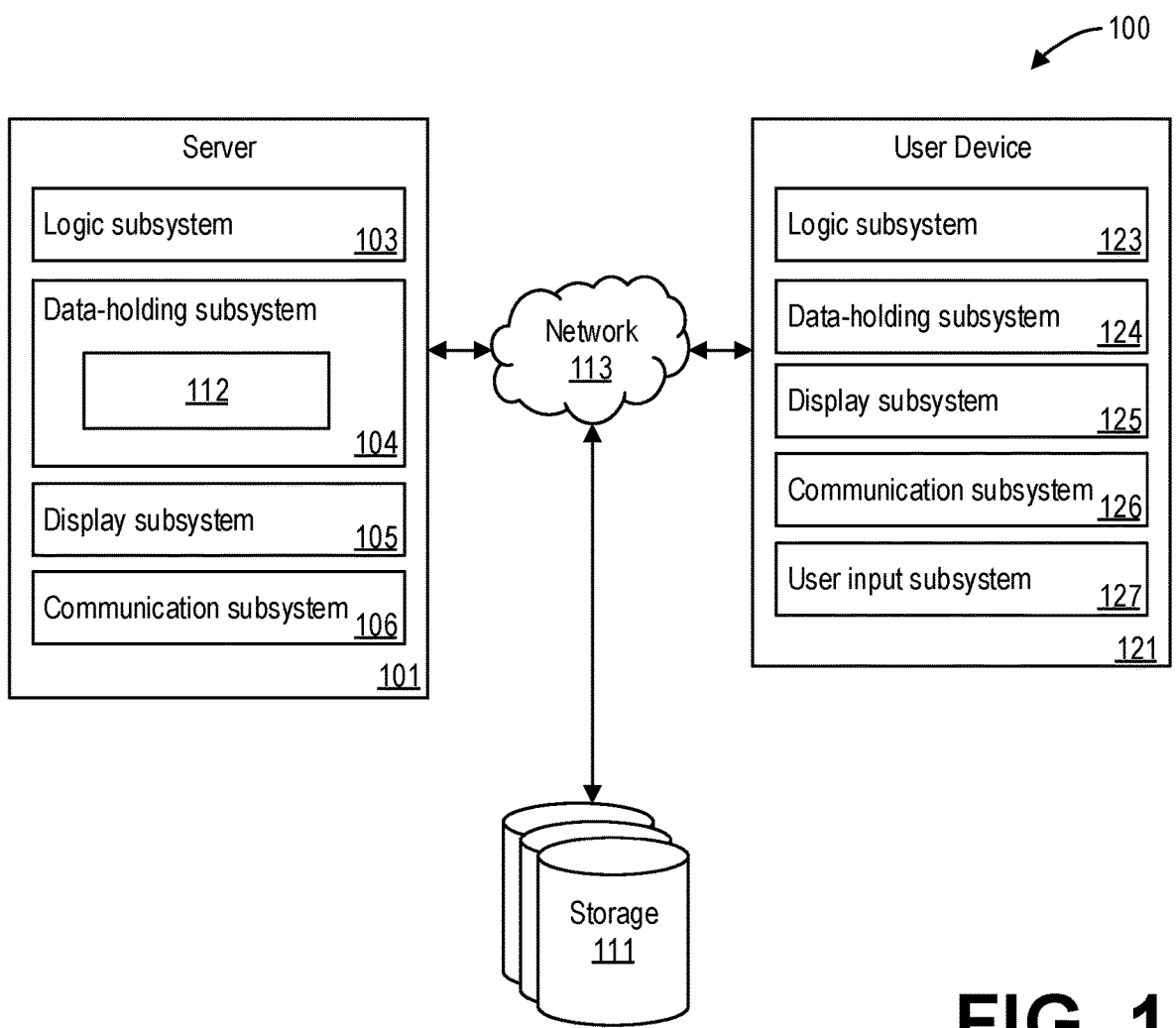
FIG. 1 illustrates an overview of an exemplary computing environment according to an embodiment.
Figure 2:
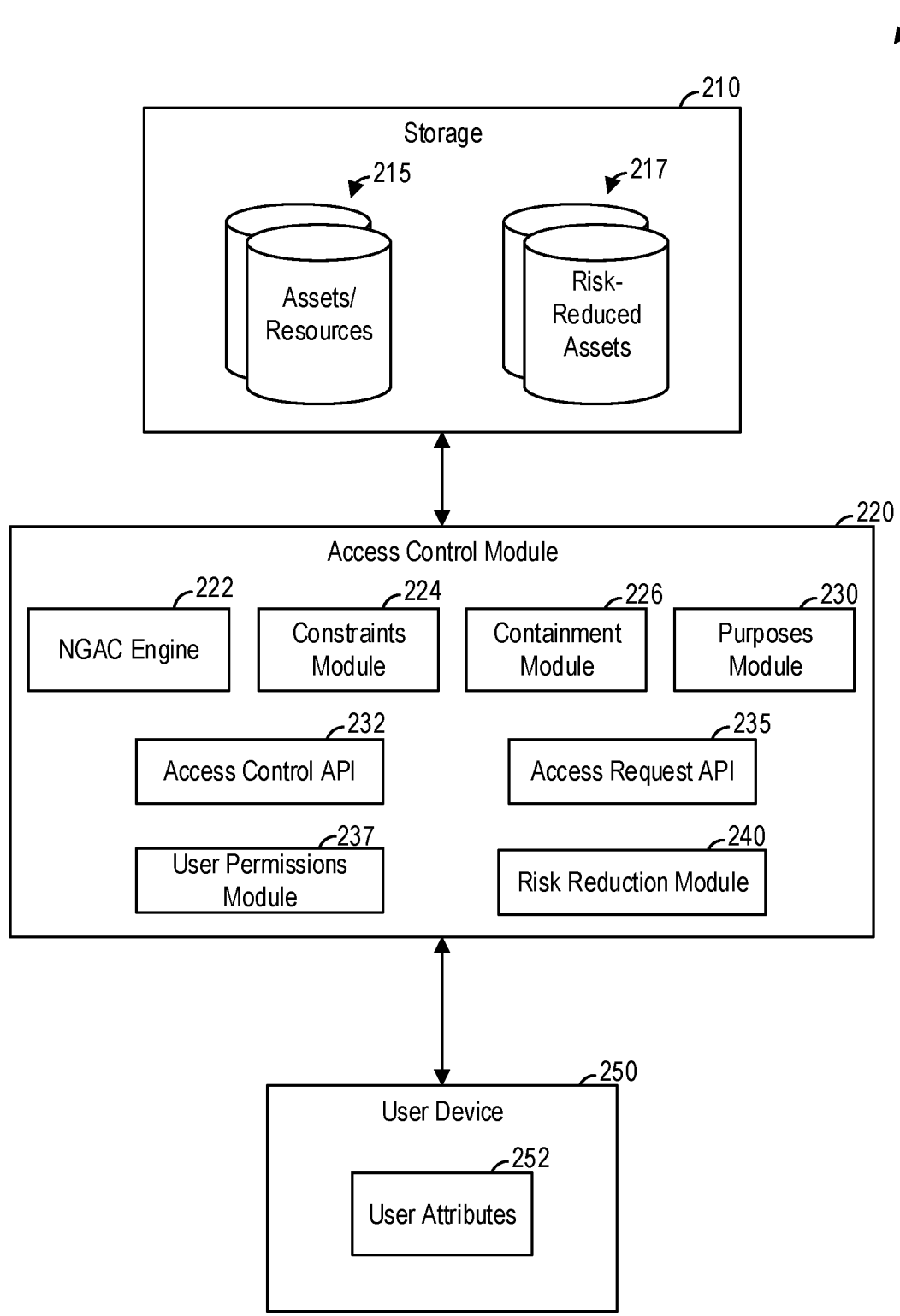
FIG. 2 shows an overview of an exemplary arrangement of software modules and data assets for purpose-based access control according to an embodiment.

FIG. 1 illustrates an example computing environment 100 in accordance with the current disclosure. In particular, computing environment 100 includes a server 101, a plurality of user devices or client systems 121, a plurality of storage devices 111, and a network 113. However, not all of the components illustrated may be required to practice the invention. Variations in the arrangement and type of the components may be made without departing from the spirit or scope of the invention.

Server 101 may be a computing device configured to implement purpose-based access control. In different embodiments, server 101 may take the form of a mainframe computer, server computer, desktop computer, laptop computer, tablet computer, home entertainment computer, network computing device, mobile computing device, mobile communication device, gaming device, etc.

Server 101 includes a logic subsystem 103 and a data-holding subsystem 104. Server 101 may optionally include a display subsystem 105, communication subsystem 106, and/or other components not shown in FIG. 1. For example, server 101 may also optionally include user input devices such as keyboards, mice, game controllers, cameras, microphones, and/or touch screens.

Logic subsystem 103 may include one or more physical devices configured to execute one or more instructions. For example, logic subsystem 103 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

Logic subsystem 103 may include one or more processors that are configured to execute software instructions. Additionally or alternatively, the logic subsystem 103 may include one or more hardware or firmware logic machines configured to execute hardware or firmware instructions. Processors of the logic subsystem 103 may be single or multi-core, and the programs executed thereon may be configured for parallel or distributed processing. The logic subsystem 103 may optionally include individual components that are distributed throughout two or more devices, which may be remotely located and/or configured for coordinated processing. One or more aspects of the logic subsystem 103 may be virtualized and executed by remotely accessible networked computing devices configured in a cloud computing configuration.

Data-holding subsystem 104 may include one or more physical, non-transitory devices configured to hold data and/or instructions executable by the logic subsystem 103 to implement the herein described methods and processes. When such methods and processes are implemented, the state of data-holding subsystem 104 may be transformed (for example, to hold different data).

Data-holding subsystem 104 may include removable media and/or built-in devices. Data-holding subsystem 104 may include optical memory (for example, CD, DVD, HD-DVD, Blu-Ray Disc, etc.), and/or magnetic memory devices (for example, hard drive disk, floppy disk drive, tape drive, MRAM, etc.), and the like. Data-holding subsystem 104 may include devices with one or more of the following characteristics: volatile, nonvolatile, dynamic, static, read/write, read-only, random access, sequential access, location addressable, file addressable, and content addressable. In some embodiments, logic subsystem 103 and data-holding subsystem 104 may be integrated into one or more common devices, such as an application-specific integrated circuit or a system on a chip.

It is to be appreciated that data-holding subsystem 104 includes one or more physical, non-transitory devices. In contrast, in some embodiments aspects of the instructions described herein may be propagated in a transitory fashion by a pure signal (for example, an electromagnetic signal) that is not held by a physical device for at least a finite duration. Furthermore, data and/or other forms of information pertaining to the present disclosure may be propagated by a pure signal.

When included, display subsystem 105 may be used to present a visual representation of data held by data-holding subsystem 104. As the herein described methods and processes change the data held by the data-holding subsystem 104, and thus transform the state of the data-holding subsystem 104, the state of display subsystem 105 may likewise be transformed to visually represent changes in the underlying data. Display subsystem 105 may include one or more display devices utilizing virtually any type of technology. Such display devices may be combined with logic subsystem 103 and/or data-holding subsystem 104 in a shared enclosure, or such display devices may be peripheral display devices.

When included, communication subsystem 106 may be configured to communicatively couple server 101 with one or more other computing devices, such as user device 121. Communication subsystem 106 may include wired and/or wireless communication devices compatible with one or more different communication protocols. As non-limiting examples, communication subsystem 106 may be configured for communication via a wireless telephone network, a wireless local area network, a wired local area network, a wireless wide area network, a wired wide area network, etc. In some embodiments, communication subsystem 106 may allow server 101 to send and/or receive messages to and/or from other devices via a network such as the public Internet. For example, communication subsystem 106 may communicatively couple server 101 with user device 121 via network 113. In some examples, network 113 may be the public Internet. In other examples, network 113 may be regarded as a private network connection and may include, for example, a virtual private network or an encryption or other security mechanism employed over the public Internet.

Further, the server 101 provides a network service that is accessible to a plurality of users through a plurality of client systems 121 communicatively coupled to the server 101 via a network 113. As such, computing environment 100 may include one or more devices operated by users, such as user device 121. User device 121 may be any computing device configured to access a network such as network 113, including but not limited to a personal computer, a laptop, a smartphone, a tablet, and the like. While one user device or client system 121 are shown, it should be appreciated that any number of user devices may be communicatively coupled to the server 101 via the network 113.

User device 121 includes a logic subsystem 123 and a data-holding subsystem 124. User device 121 may optionally include a display subsystem 125, communication subsystem 126, and/or other components not shown in FIG. 1.

Logic subsystem 123 may include one or more physical devices configured to execute one or more instructions. For example, logic subsystem 123 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

Logic subsystem 123 may include one or more processors that are configured to execute software instructions. Additionally or alternatively, the logic subsystem 123 may include one or more hardware or firmware logic machines configured to execute hardware or firmware instructions. Processors of the logic subsystem 123 may be single or multi-core, and the programs executed thereon may be configured for parallel or distributed processing. The logic subsystem 123 may optionally include individual components that are distributed throughout two or more devices, which may be remotely located and/or configured for coordinated processing. One or more aspects of the logic subsystem 123 may be virtualized and executed by remotely accessible networking computing devices configured in a cloud computing configuration.

Data-holding subsystem 124 may include one or more physical, non-transitory devices configured to hold data and/or instructions executable by the logic subsystem 123 to implement the herein described methods and processes. When such methods and processes are implemented, the state of data-holding subsystem 124 may be transformed (for example, to hold different data).

Data-holding subsystem 124 may include removable media and/or built-in devices. Data-holding subsystem 124 may include optical memory (for example, CD, DVD, HD-DVD, Blu-Ray Disc, etc.), and/or magnetic memory devices (for example, hard drive disk, floppy disk drive, tape drive, MRAM, etc.), and the like. Data-holding subsystem 124 may include devices with one or more of the following characteristics: volatile, nonvolatile, dynamic, static, read/write, read-only, random access, sequential access, location addressable, file addressable, and content addressable. In some embodiments, logic subsystem 123 and data-holding subsystem 124 may be integrated into one or more common devices, such as an application-specific integrated circuit or a system on a chip.

When included, display subsystem 125 may be used to present a visual representation of data held by data-holding subsystem 124. As the herein described methods and processes change the data held by the data-holding subsystem 124, and thus transform the state of the data-holding subsystem 124, the state of display subsystem 125 may likewise be transformed to visually represent changes in the underlying data. Display subsystem 125 may include one or more display devices utilizing virtually any type of technology. Such display devices may be combined with logic subsystem 123 and/or data-holding subsystem 124 in a shared enclosure, or such display devices may be peripheral display devices.

When included, communication subsystem 126 may be configured to communicatively couple user device 121 with one or more other computing devices, such as server 101. Communication subsystem 126 may include wired and/or wireless communication devices compatible with one or more different communication protocols. As non-limiting examples, communication subsystem 126 may be configured for communication via a wireless telephone network, a wireless local area network, a wired local area network, a wireless wide area network, a wired wide area network, etc. In some embodiments, communication subsystem 126 may allow user device 101 to send and/or receive messages to and/or from other devices, such as server 101, via a network 113 such as the public Internet.

User device 121 may further include a user input subsystem 127 comprising user input devices such as keyboards, mice, game controllers, cameras, microphones, and/or touch screens. A user of user device 121 may input an access request or action request, for example, via user input subsystem 127. As discussed further herein, user device 121 may stream, via communication subsystem 126, user input received via the user input subsystem 127 to the server 101 over the network 113. In this way, a user device 121 may submit a request to the server 101 to access resources stored in storage 111. As another example, the user of the user device 121 may input, via the user input subsystem 127, modifications to the purpose-based access control of server 101 and such modifications may be communicated over the network 113 via the communication subsystem 126.

Thus server 101 and user device 121 may each represent computing devices which may generally include any device that is configured to perform computation and that is capable of sending and receiving data communications by way of one or more wired and/or wireless communication interfaces. Such devices may be configured to communicate using any of a variety of network protocols. For example, user device 121 may be configured to execute a browser application that employs HTTP to request information from server 101 and then displays the retrieved information to a user on a display.

FIG. 2 shows an overview of an exemplary architecture 200 of software modules and data assets for purpose-based access control according to an embodiment. Storage 210 may include one or more databases 215 storing assets or resources, as well as one or more databases 217 storing risk-reduced assets. Access control module 220 may comprise, for example, a Next Generation Access Control (NGAC) engine 222, a constraints module 224, a containment module 226, a purposes module 230, an access control application program interface (API) 232, an access request API 235, a user permissions module 237, and a risk reduction module 240. Access control module 220 may be stored as instructions 112 in the data-holding subsystem 104 of the server 101 depicted in FIG. 1, for example.

A user device 250 may include, as an illustrative example, user attributes 252 identifying a user of the user device 250, which may comprise the user device 121 described hereinabove. As described further herein, the user may submit an access request along with a purpose for accessing assets or resources in the storage 210. The access request may be submitted via the access request API 235 of the access control module 220, for example. The user attributes 252 may be compared against the user permissions module 237 to determine whether the user is permitted to perform any actions for the specified purpose.

Further, the access request submitted via the access request API 235 may be communicated to the NGAC engine 222 for determining access to the assets or resources in the storage 210. NGAC engine 222 may determine access to one or more resources or assets stored in storage 210 based on next generation access control. To that end, NGAC engine 222 may include a plurality of components arranged in a functional architecture as described further herein with regard to FIG. 3.

In other examples, the user of the user device 250 may communicate with the access control module 220 via the access control API 230 to modify purposes of the purposes module 230, constraints of the constraints module 224, or containments of the containments module 226. Such users may include various custodians. For example, business users, such as product managers and operational managers may provide or define the purposes that the business is trying to achieve. Legal, privacy, compliance, and security teams may provide the rules to tie authorization approval or denial from a purpose to an instrument. Legal, privacy, compliance, and security teams may further provide the guidelines as to how instruments should be tagged onto assets. Data engineers and applications developers tag the assets 215 with the appropriate instruments. Business managers tie users to purposes for certain actions. Consumers may also tie consent to an instrument on certain assets for certain actors for a period of time or a number of occurrences. A request ties an actor to a purpose for an action on an asset in real time.

The risk reduction module 240 may be configured to perform purpose-driven risk reduction, which comprises the process of reducing accuracy of one or more assets to minimize the chance of re-identifying a subject associated with the asset without materially impacting the purpose for which the access to the asset was provided. In this context, accuracy is the degree to which an asset conforms to the real world value it represents. An asset is risk reduced by creating a derived asset 217 that lowers the original accuracy. For example, risk may be reduced via suppression (e.g., excluding the date of birth if the age is greater than 89), generalization (e.g., month and year of date of birth), or perturbation (e.g., randomly plus or minus 14 days from the date of birth). A re-identification score is a value that indicates how likely it is that a subject can be re-identified from the asset provided. The higher the value, the more likely re-identification is. A re-identification threshold is a value which re-identification scores are not to exceed to be acceptable. A recipient is an actor, a custodian, or a subject receiving the asset. A purpose is assigned an effective-use re-identification threshold that needs to be exceeded by the combined asset's re-identification score for the information to have use for the purpose. The purpose can be assigned a minimum-necessary re-identification threshold that cannot be exceeded by the combined asset's re-identification score to ensure that only the minimum necessary information to fulfill that purpose is disclosed. A recipient is assigned a re-identification threshold for a specific purpose based on their security posture and any agreements that are in place. Such a re-identification threshold may be stored in the user attributes 252 and/or the user permissions module 237, for example. The recipient can be allowed access to a purpose only if the recipient's re-identification threshold meets or exceeds that purpose's minimum-necessary re-identification threshold. A recipient receives a set of assets for a purpose they are allowed access to and where the combined asset's re-identification score resides between that purpose's effective-use re-identification threshold and the minimum-necessary re-identification threshold.

As an illustrative example, assume demographic data has been purchased from a credit-based third party provider. The contract stipulates that the data cannot be resold, the data cannot be shared with the subject, the data cannot be used for financial assessment or analysis of the subject, and any derivative whose value allows reverse engineering of the original data is held to the same data use restrictions as the original data. The company's goal is to use this data as broadly as possible across the whole organization, including any wholly-owned subsidiaries. Purpose-based access control as described herein enables users across the organization to access the data while complying with the rules set forth in the contract.

As another example, company data is routed through an external service provider to supplement the data with a decision and a reason code for that decision. The contract stipulates the following data use restrictions: the reason codes can only be shared outside the company if the recipient of the reason codes is not one from a list of competitors; the list of competitors will be provided by the vendor and any updates to the list need to be enforced within 30 days of receiving the update; this limitation is lifted when the data has reason code that has been assigned three or more years ago. The company's goal is to share the data with anyone they deem fit while adhering to this contractual limitation. Such restrictions are easily implementable using the access control module 220.

For purpose-based access control, similar to role-based access control, a user is assigned to one or more role(s). A manager, for example, may assign the user to the one or more role(s). In contrast from role-based access control, for purpose-based access control the role assigned to the user is approved for a combination of an action, a purpose, and an environment. The user submits a request comprising an action, a purpose, and a scope. The request thus specifies that the user with the role would like to perform the action on assets within the scope for the uses within the purpose in the environment. As described further herein, purpose-based access control evaluates whether the user can access the assets.

A purpose is a set of public uses, while a scope is a set of assets. A use approves and denies actions for an instrument, which approves and denies actions for an asset. An instrument comprises a reference to a document, or a subset thereof, that allows or denies a single, legally enforceable act, process, duty, obligation, or right. For example, an instrument may relate to a common law, federal law, state law, local ruling, a contract, a company policy, and so on.

An asset, also referred to herein as an Object, comprises data or a process that is parsed out sufficiently to explicitly assign instruments to it. Example assets include social security numbers (SSN), date of birth (DOB), salary, address, and so on. Example assets that comprise a process may include adjudication of a claim, updating of an address, and so on. A purpose comprises an act, process, duty, obligation, or right, or a distinct grouping thereof, that is referenced by one or more instruments.

Figure 3:
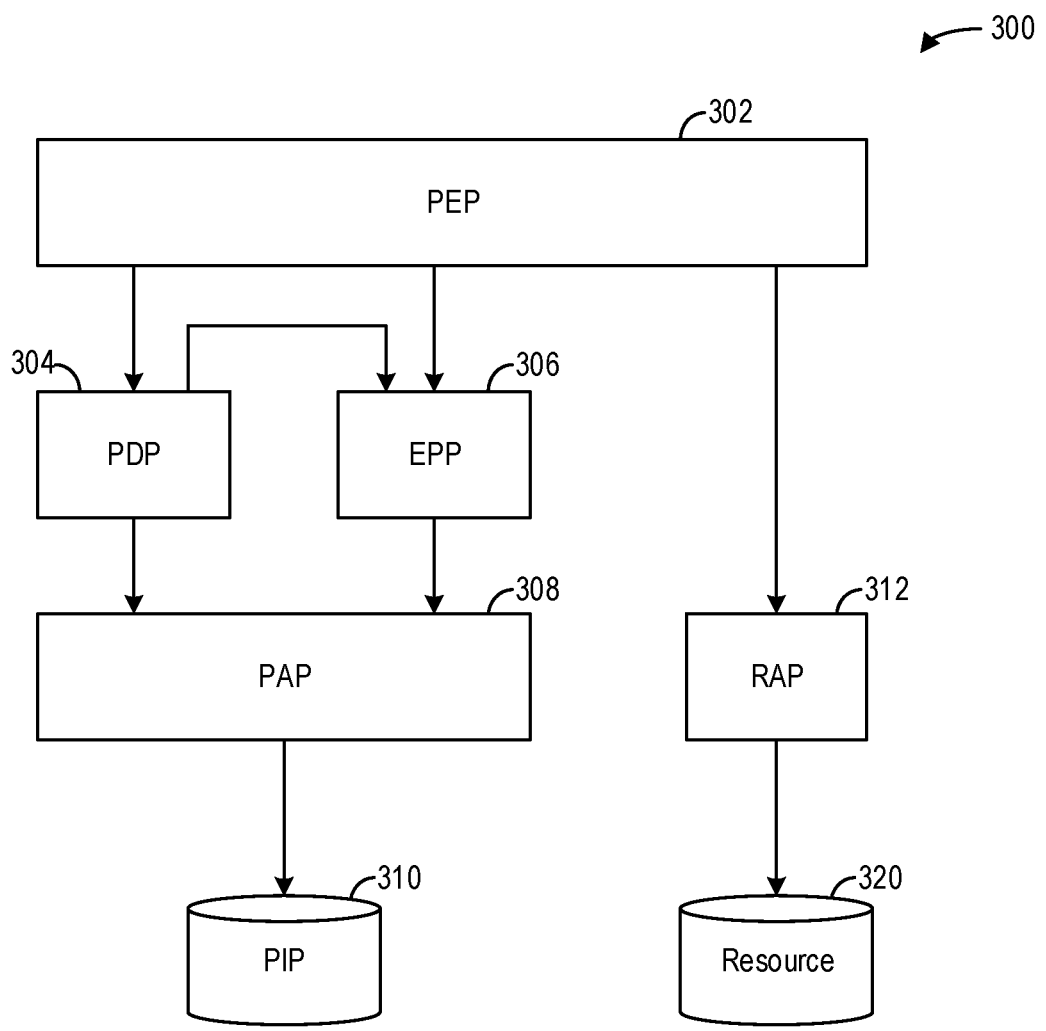
FIG. 3 shows a high-level block diagram illustrating an example architecture of a Next Generation Access Control (NGAC) engine according to an embodiment.

FIG. 3 shows a high-level block diagram illustrating an example architecture of a Next Generation Access Control (NGAC) engine 300 for controlling access to protected resources 320 according to an embodiment. The NGAC engine 300 includes, for example, a Policy Enforcement Point (PEP) 302, a Policy Decision Point (PDP) 304, an Event Processing Point (EPP) 306, a Policy Administration Point (PAP) 308, a Policy Information Point (PIP) 310, and a Resource Access Point (RAP) 312.

The PEP 302 provides an interface such as an API for providing access to protected resources and to policy information. The PEP 302 verifies access requests to ensure that such requests are in conformance with a specified policy before the access may proceed. The PEP 302 communicates the access request to the PDP 304 for decisions.

The PDP 304 determines whether an access request received from the PEP 302 complies with policy and renders a grant, deny, or error decision accordingly. To determine whether the access request complies with policy, the PDP 304 retrieves the information needed to verify the access request from the PIP 310 via the PAP 308. If the access request is granted, the PDP 304 provides a grant response to the PEP 302 that includes data for locating and accessing the resource, while if the access request is denied, the PDP 304 communicates the deny decision to the PEP 302 in the response.

The PIP 310 stores the data structures that define the policy elements and the relationships between policy elements that collectively constitute the access control policy enforced by the NGAC engine 300. Changes to policy therefore occur at the PIP 310.

The RAP 312 allows one or more PEPs 302 to gain access to protected resources 320. In order to access a protected resource 320, the PEP 302 issues a command to the RAP 312 including its identifier, a location of the desired resource in the resources 320, the operation, and any additional information to the RAP 312. The RAP 312 returns data and status information to the PEP 302. The RAP 312 does not allow access to resources 320 for any component other than the PEP 302.

The PAP 308 manages access to the contents of the PIP 310, similar to how the RAP 312 manages access to the contents of the resources 320. The PAP 308 provides read, modify, and write access to the content within the PIP 310, such as the policy configuration. The PAP 308 limits the EPP 306 to read access, but allows read and write access for the PDP 304.

The EPP 306 compares events against event patterns that have been defined in obligations residing at the PIP 310. When access is granted to a protected resource, the PDP 304 generates an event describing the access and communicates the event to the EPP 306 for processing. For each event pattern that is matched with an event received from the PDP 304, the EPP 306 uses the PDP 304 to make an access request decision on the associated event response, such as the sequence of actions defined for each obligation, and to carry out the response.

Figure 4:
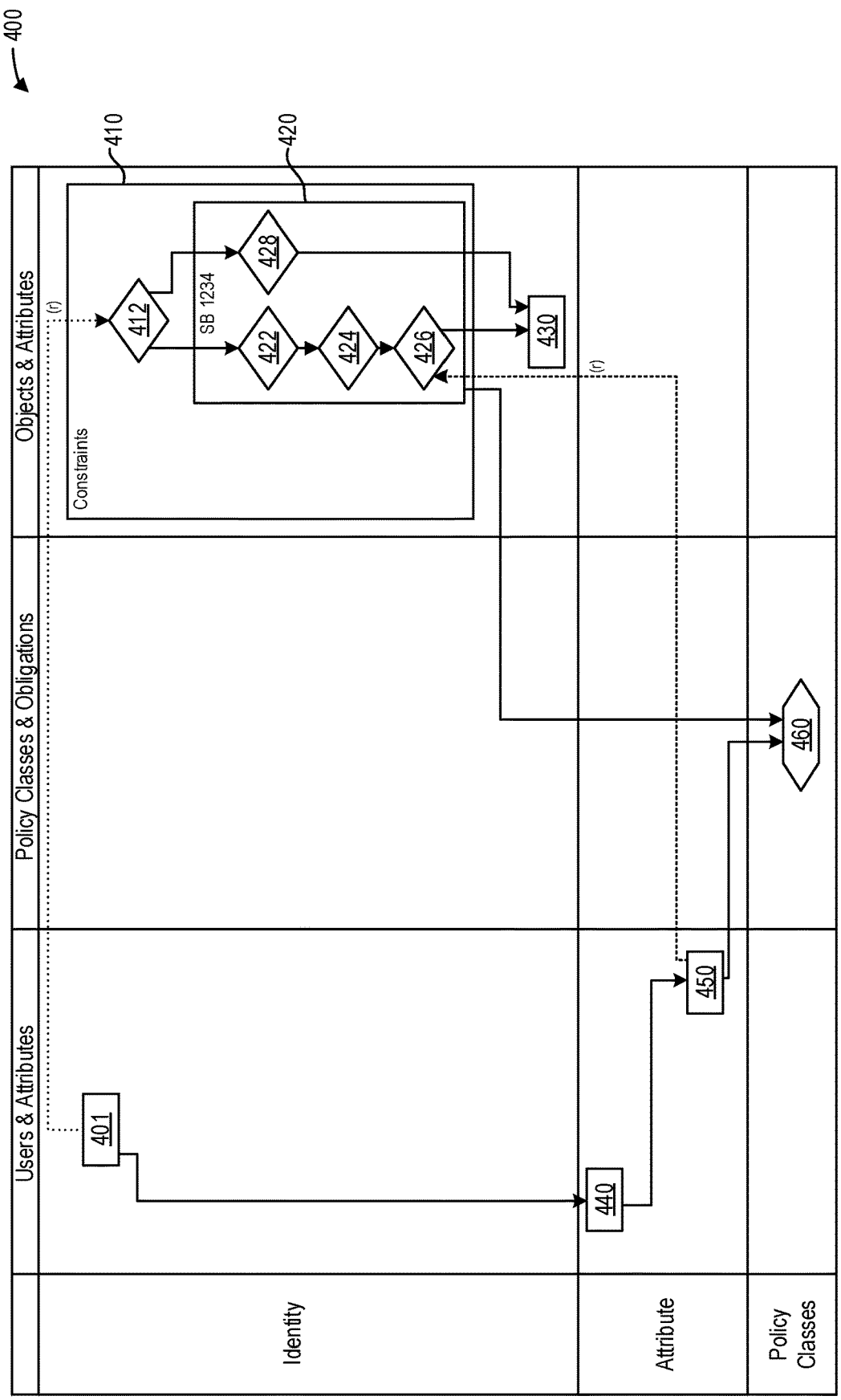
FIG. 4 shows a high-level diagram illustrating an example of access control with constraints for implementing a legal instrument according to an embodiment.

FIG. 4 shows a high-level diagram illustrating an example of access control 400 with constraints 410 for implementing a legal instrument according to an embodiment. In particular, the access control 400 relates to the regulation of access by a user, such as User 401, to an object subject to access control 400, such as Claims Object 430. In a regulated industry such as healthcare, legal instruments, such as federal, state, and local laws, contracts, terms of use, privacy policies, and individual consents, drives the need for fine-grained access control. The grain of the control required commonly resides below the level that resources can manage their authorizations on a per user level.

As an illustrative example, suppose a certain State Senate Bill, say SB 1234, enacted by a certain state government specifies limitations for accessing the personal information of certain individuals, say Protected Individuals, given certain Sensitive Conditions. The legal instrument corresponding to SB 1234 may be implemented as a Policy Class, such as SB 1234 Policy Class 460.

Constraints 410 describe limitations that are to be applied to an Object the Constraint is assigned to. Constraints can be chained, in that a Constraint can be assigned to another Constraint. To ensure proper treatment of each instrument, a convention of least privilege may be followed by applying the largest number of Constraints 410 applicable to a request and prescribing that each instrument should be managed as an individual Policy Class.

The core limitations to access specified in SB 1234 may be implemented as a set of SB 1234 Constraints 420. Thus, the constraints 410 may initially include a Subscriber Filter Constraint 412 for the User 401, corresponding to a Subscriber Reporting Attribute 440, which filters a request from the User 401. According to the Subscriber Filter Constraint 412, the access request may relate to diagnosis and treatment attributes which are constrained by Diagnosis and Treatment Attributes Constraints 422 of the SB 1234 Constraints 420.

Such Diagnosis and Treatment Attributes Constraints 422 are linked to Sensitive Conditions Constraints 424, and Protected Individuals Constraints 426, in accordance with the limitations specified by the SB 1234. Alternatively, according to the Subscriber Filter Constraint 412, the access request may relate to other claims attributes instead of the diagnosis and treatment attributes impacted by the SB 1234, and so the access request may be constrained by the Other Claim Attributes Constraint 428 for accessing the Claims Object 430.

As depicted, the User 401 is assigned the Subscriber Reporting Attribute 440, which is in turn assigned to the SB 1234 Control Point Attribute 450 so that access requests from the User 401 relating to subscriber reporting are appropriately constrained according to the SB 1234 Constraints 420.

Further, the systems and methods for access control provided herein further provide for data containment. For example, legal instruments may constrain the ability for data to be transmitted or stored in certain environments. For example, organizations need to ensure that people with broad access do not accidentally store data subject to the Health Insurance Portability and Accountability Act (HIPAA), or simply HIPAA data, in environments that have not been set up for HIPAA data. Similar rules could be desirable to address legal entity separation within a holding corporation, or when needing to keep data within legal jurisdictions, such as the European Union (EU) or the United States of America (USA), at international cloud providers. With the need for containment arises the need for controlled transfer across containment boundaries.

Figure 5:
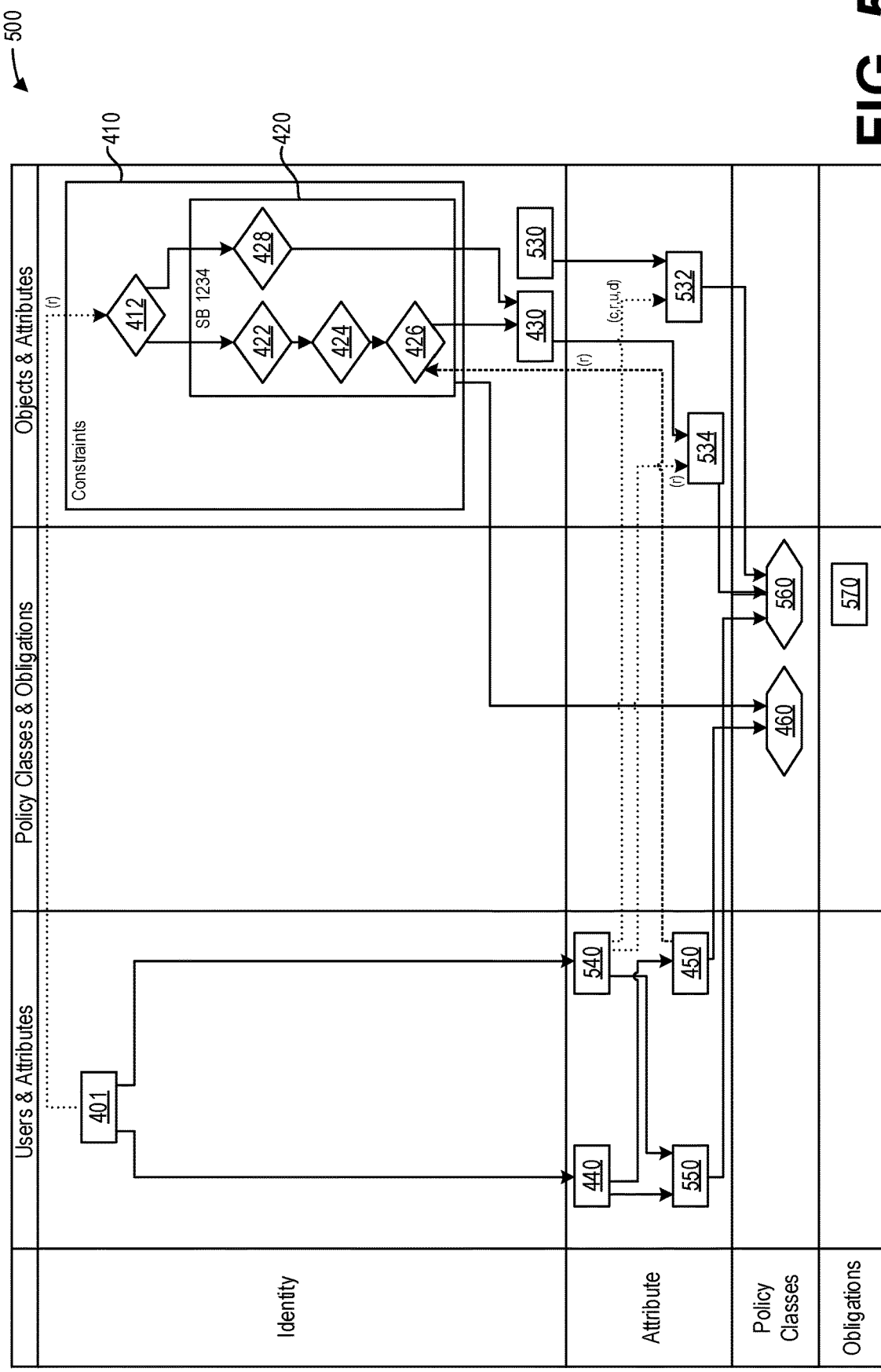
FIG. 5 shows a high-level diagram illustrating an example of access control with containment according to an embodiment.

As an illustrative example, FIG. 5 shows a high-level diagram illustrating an example of access control 500 with containment according to an embodiment. The access control 500 expands on the access control 400 described hereinabove with regard to FIG. 4. In particular, access control 500 includes a De-identify HIPAA Attribute 540 assigned to the User 401, as well as an additional policy class, namely the HIPAA Containment Policy Class 560.

All purposes may be assigned to the HIPAA Containment Policy Class 560 via the All Purposes Attribute 550. Further, a HIPAA Object Attribute 534 may be created to represent the containment instrument. The HIPAA Object Attribute 534 is assigned to the HIPAA Containment Policy Class 560. All appropriate objects, such as the Claims Object 430, are assigned to the HIPAA object attribute 534. Further, to establish containment, the access control 500 includes an Obligation 570 that specifies that if an Object that has a path to the HIPAA Object Attribute 534 is accessed with rights that required containment (e.g., read or r), then prohibit the user (e.g., User 401) from requesting certain rights (e.g., create or c, update or u, delete or d) on Objects that are not part of that containment. Obligations such as Obligation 570 are executed automatically based on event occurrence to establish the prohibition.

In order to implement cross-containment transfer, the access control 500 further includes a De-Identification Object Attribute 532 for objects that will hold the data that has been transferred out of the instrument's containment. The De-Identification Object Attribute 532 is assigned to the policy class of the instrument, the HIPAA Containment Policy Class 560, as depicted. All appropriate Objects, such as the De-Identification Object 530, are assigned to the De-Identification Object Attribute 532. Further, a De-Identification HIPAA User Attribute 540 is established and users, such as the User 401, who are allowed to transfer objects out of the containment area are assigned to the De-Identification HIPAA User Attribute 540. Further, the De-Identification HIPAA User Attribute 540 is assigned, directly or indirectly, to the policy class of the instrument. For example, as depicted, the De-Identification HIPAA User Attribute 540 is assigned to the All Purposes Attribute 550 in order to associate the De-Identification HIPAA User Attribute 540 with the HIPAA Containment Policy Class 560. Furthermore, the appropriate rights are associated from the De-Identification HIPAA User Attribute 540 to the relevant object attributes. In particular, as depicted, the read (r) right is associated from the De-Identification HIPAA User Attribute 540 to the HIPAA Object Attribute 534 while the create, update, delete (c, u, d) rights are associated from the De-Identification HIPAA User Attribute 540 to the De-Identification Object Attribute 532. Further, to implement cross-containment transfer, the Obligation 570 is amended to specify that if an Object that has a path to the HIPAA Object Attribute 534 has been accessed with rights that required containment (e.g., read), then prohibit the user (e.g., User 401) from requesting certain rights (e.g., create, update, delete) on Objects that are not part of that containment object attribute (e.g., HIPAA Object Attribute 534) nor the cross-containment object attribute (e.g., De-Identification Object Attribute 532).

In the systems and methods for access control provided herein, constraints are not limited to rows or columns in a database, but may also be related to environmental attributes, such as dates.

Figure 6:
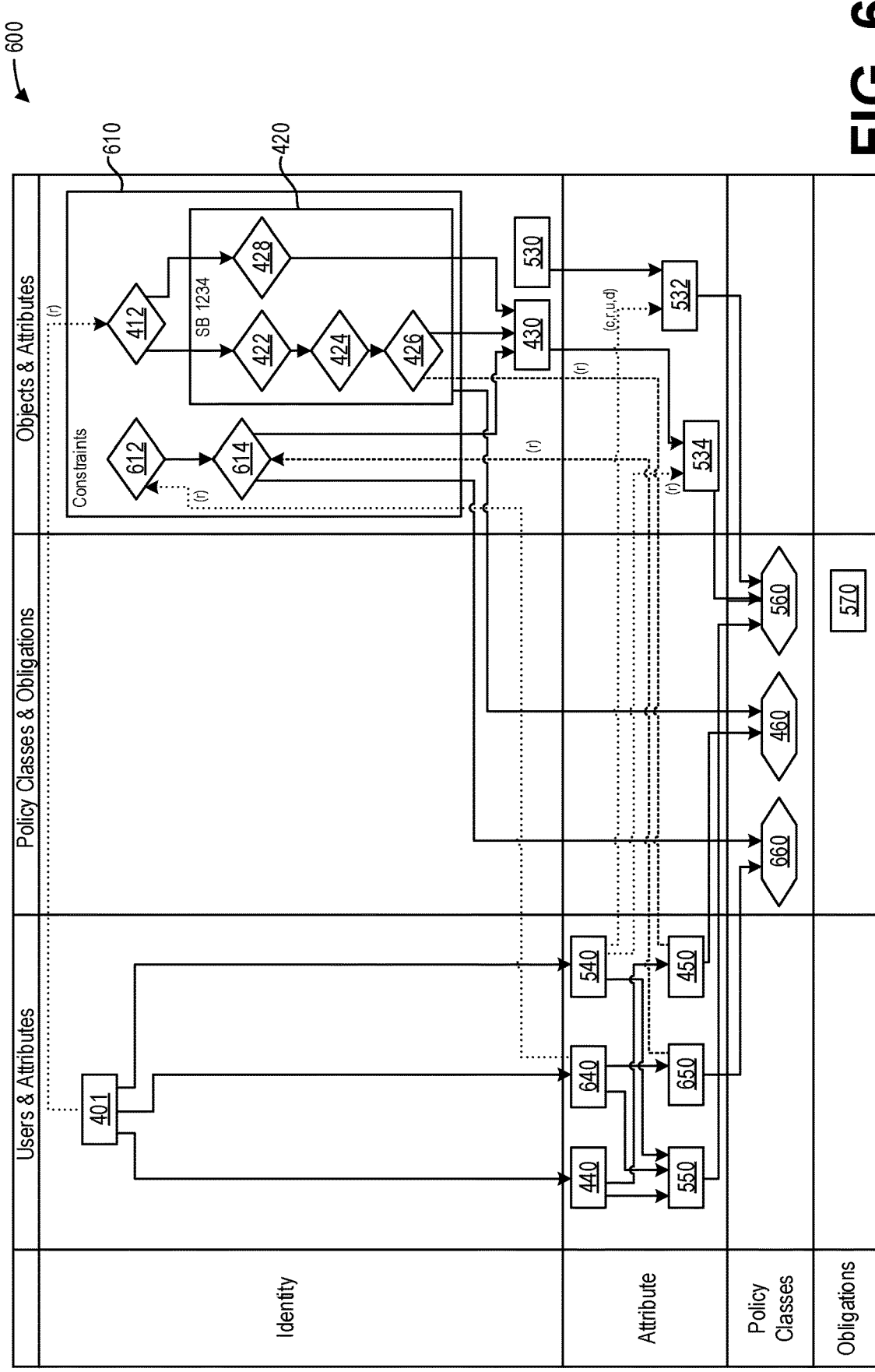
FIG. 6 shows a high-level diagram illustrating an example of access control with environmental constraints according to an embodiment.

As an illustrative and non-limiting example, FIG. 6 shows a high-level diagram illustrating an example of access control 600 with environmental constraints according to an embodiment. The access control 600 further expands on the access control 500 described hereinabove with regard to FIG. 5. In particular, to illustrate how dates may be implemented as environmental constraints, access control 600 includes additional components for implementing environmental constraints relating to the Medicare Prohibition of Open Enrollment Period Marketing.

Access control 600 includes Constraints 610 that include the Subscriber Filter Constraint 412 as well as the SB 1234 Constraints 420. The Constraints 610 further include Medicare Marketing Attributes Constraints 612 which are associated with Medicare Marketing Black-Out Period Constraints 614. The User 401 may be assigned to a Medicare Marketing User Attribute 640, which in turn is assigned to All Purposes Attribute 550 and a Medicare Marketing Black-Out Period Control Point Attribute 650. The Medicare Marketing User Attribute 640 is positively associated with the Medicare Marketing Attributes Constraint 612, for read rights, whereas the Medicare Marketing Black-Out Period Control Point Attribute 650 is negatively associated with the Medicare Marketing Black-Out Period Constraints 614, for the read rights. Thus, Medicare marketing attributes may be accessible for the purpose of Medicare marketing unless the current date of the access request, indicated by the system clock for example, is determined to be within the Medicare marketing black-out period. The Medicare Marketing Black-Out Period Constraints 614, due to the negative association for read rights with the Medicare Marketing Black-Out Period Control Point Attribute 650 assigned to the User 401 via the Medicare Marketing User Attribute 640, thus prohibits access for the Medicare marketing purpose during the black-out period. The legal instrument of the Medicare Marketing Black-Out is implemented as the Medicare Marketing Black-Out Policy Class 660, which is assigned to the Medicare Marketing Black-Out Period Control Point Attribute 650 and the Medicare Marketing Black-Out Period Constraints 614.

User-side environmental constraints may also be implemented via the systems and methods for access control described herein. As an illustrative and non-limiting example, user-side environmental constraints may allow a user, such as User 401, to access resources only during business hours. Such constraints are then independent of the objects the user is authorized to access. In some examples, implementing user-side environmental constraints may include tracing the constraints path from the requesting user, creating a virtual user for each of the constraint paths identified, and modifying the request to reference the virtual users instead. An example of access control with such user-side environmental constraints is described further herein with regard to FIG. 14.

In the various examples of access control described hereinabove, it is clear that the motivations vary for the different instruments and that the instruments do not allow the co-mingling of these purposes. While the access control as provided herein ensures least privilege for objects that are shared across policy classes, this does not prevent a user from accidentally or intentionally abusing one access right for the wrong purpose. To ensure that access is authorized for an appropriate purpose, the systems and methods for access control described herein may be extended to include Purposes as a concept. As an illustrative and non-limiting example, FIG. 7 shows a high-level diagram illustrating an example of access control 700 with purpose-based access control according to an embodiment. The access control 700 further expands on the access control 600 described hereinabove with regard to FIG. 6. In particular, access control 700 organizes or re-defines the User Attributes 440, 540, and 640 described hereinabove into Purposes Attributes 738, with the addition of a "No Purpose" Purpose 740 for indicating that no purpose is associated with the access request from the User 401. The "No Purpose" Purpose 740 is assigned to the All Purposes Attribute 550.

Furthermore, Purpose-Based Control Objects 710 are defined, including a De-Identification Control Object 712 for containment, a Medicare Marketing Control Object 714 for environmental constraints, and a Subscriber Reporting Control Object 716 for constraining reporting in accordance with SB 1234.

Purpose-based access control may thus be implemented as a policy class, such as Purpose-Based Access Control Policy Class 760. Further, a Purpose-Based Access Control Control Point 730 may be created and assigned to the Purpose-Based Access Control Policy Class 760. The Purpose-Based Control Objects 710 and the All Purposes Attribute 550 are assigned to the Purpose-Based Access Control.

Further, an Obligation 770 may be created for the Purpose-Based Access Control Policy Class 760. The Obligation 770 may specify that, when reading on one of the Purpose-Based Control Objects 710, then un-assign the User 401 from the "No Purpose" Purpose 740 and assign the User 401 to the appropriate Purpose of the Purposes 738 for the duration of the session. Thus, if the User 401 submits an access request that reads on one of the Purpose-Based control Objects 710 without explicitly specifying a purpose for the access request, the Obligation 770 automatically assigns the access request to the appropriate purpose.

As discussed hereinabove, the systems and methods provided herein expand on the concept of Next Generation Access Control by introducing the notion of constraints, which enable instrument-based access control, access control with environmental constraints, purpose-based access control, and combination thereof. To extend the capabilities of NGAC to include constraints, the NGAC engine 222, for example, may be configured with additional processing steps for determining access.

As an example, FIG. 8 shows a high-level flow chart illustrating an example method 800 for access control with constraints for implementing a legal instrument according to an embodiment. In particular, method 800 relates to additional processing by the NGAC engine 222, for example by the constraints module 224, for authorizing access to resources with the access subject to constraints.

Method 800 begins at 805. At 805, method 800 receives an access request from a User for one or more Object(s). Responsive to the access request, method 800 continues to 810. At 810, method 800 performs pre-processing for constraints on the Object(s). The pre-processing for constraints begins at 812. At 812, for each Object requested, and for each Policy Class, method 800 traces each path of the assignment graph up to the furthest assigned Constraint that approves or prohibits the requested access right. At 814, method 800 determines whether any Constraint paths were returned at 812. If not ("NO"), method 800 continues to 816, wherein method 800 proceeds to normal NGAC processing of the access request.

However, if Constraint paths were returned at 812 ("YES"), method 800 continues to 818. At 818, for each Constraint path returned at 812, method 800 negates the Constraint if the requested access right is associated with the Constraint by a prohibition. If the Constraint is both allowed and prohibited for the requested access right, then method 800 eliminates the Constraint path from consideration. Continuing at 820, for each Constraint Path remaining after 818, method 800 defines a Virtual Object, for the current NGAC session only, based on the Object with all Constraints from the Constraint path applied to the Object using a logical AND operation. At 822, method 800 alters the access request so that the original Object requested is replaced with requests for each of the generated Virtual Objects.

After pre-processing for the constraints at 810, method 800 continues to 825. At 825, method 800 performs NGAC processing with the rewritten access request generated at 822. After performing NGAC processing with the rewritten access request, method 800 continues to 830. At 830, method 800 performs post-processing for the constraints. For example, dynamically generated Virtual Objects are temporary and do not exist outside the scope of a single access request. However, to post-process the constraints during the access request, the PDP 304 informs the PEP 302 of all Virtual Objects that are approved for access, and the RAP 312 reconstitutes the multiple Virtual Objects based on the same Object into a single Object for the PEP 302.

After post-processing of the constraints, method 800 continues to 835. At 835, method 800 determines an authorization response. The authorization response specifies whether the access request for the one or more Objects is permitted. At 840, method 800 determines whether the authorization response includes a permitted query. If the authorization response does not include a permitted query ("NO"), method 800 continues to 845. At 845, method 800 blocks access to the Object(s) in the database. Method 800 then returns.

However, if the authorization response includes a permitted query ("YES"), method 800 continues to 850. At 850, method 800 communicates the permission to the database.

At 855, method 800 performs the data operation (e.g., create, read, update, delete) on the Virtual Object(s) in the database. Method 800 then returns.

The constraint model and the processing associated with the constraint model for access control provided herein enable substantial improvements over previous access control systems. For example, when implementing the examples of access control with and without a constraint model as discussed further herein with regard to FIGS. 12 and 13, respectively, for an implementation with 100,000 users, the access control without a constraint model results in almost 500,000 duplicate items that need to be maintained. As another example, considering a constraint model including a user constraint and four additional constraints, implementing access control for 100 users and 100 objects with a constraint model including a user constraint and four additional constraints would utilize 104 constraints, 400 assignments, and 100 associations, whereas implementing a same level of access control without a constraint model would require 10,000 virtual objects, 10,000 assignments, and 10,000 associations. Thus, the systems and methods for access control provided herein substantially improve the manageability of access control for a plurality of users.

Figure 9:
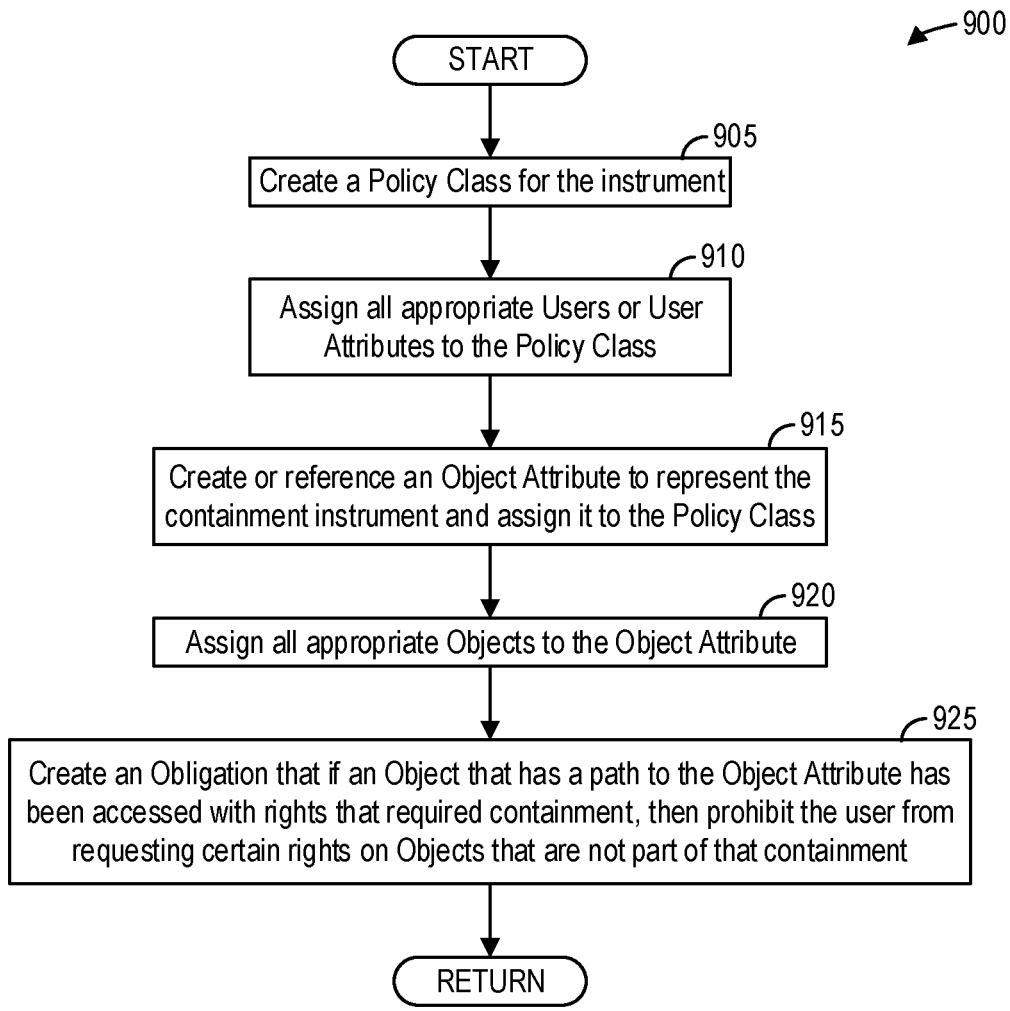
FIG. 9 shows a high-level flow chart illustrating an example method for establishing containment with access control according to an embodiment.

As discussed hereinabove with regard to FIG. 5, the systems and methods for access control provided herein enable the containment of data or Objects according to legal instruments with Policy Classes and constraints as described hereinabove. FIG. 9 shows a high-level flow chart illustrating an example method 900 for establishing containment with access control according to an embodiment. Method 900 begins at 905. At 905, method 900 creates a Policy Class for the instrument. For example, with reference to access control 500, the HIPAA Containment Policy Class 560 is created to implement the legal instrument known as HIPAA. At 910, method 900 assigns all appropriate Users or User Attributes to the Policy Class. For example, the All Purposes Attribute 550 is assigned to the HIPAA Containment Policy Class 560.

Continuing at 915, method 900 creates or references an Object Attribute to represent the containment instrument and assigns it to the Policy Class. For example, method 900 creates the HIPAA Object Attribute 534 to represent the containment instrument and assigns it to the HIPAA containment Policy Class 560. At 920, method 900 assigns all appropriate Objects to the Object Attribute. For example, method 900 assigns the Claims Object 430 to the HIPAA Object Attribute 534.

At 925, method 900 creates an Obligation, such as Obligation 570, that if an Object that has a path to the Object Attribute has been accessed with rights that required containment, then prohibit the user from requesting certain rights on Objects that are not part of that containment. Thus, as depicted in FIG. 5, if an Object that has a path to the HIPAA Object Attribute 534 has been accessed with rights that required containment, noted in FIG. 5 as read rights, then prohibit the User 401 from requesting certain rights (i.e., c, u, and d) on Objects that are not part of the HIPAA Containment Policy Class 560. Method 900 then returns.

As further described hereinabove, cross-containment transfer is also enabled for the systems and methods for access control provided herein. FIG. 10 shows a high-level flow chart illustrating an example method 1000 for controlling cross-containment transfer with access control according to an embodiment. Method 1000 begins at 1005. At 1005, method 1000 creates a cross-containment Object Attribute for Objects that will hold the data that has transferred out of the containment. For example, with regard to access control 500 of FIG. 5, method 1000 creates a De-Identification Object Attribute 532 for those Objects that will hold the data that has been transferred out of the instrument's containment. At 1010, method 1000 assigns the cross-containment Object Attribute to the Policy Class. For example, method 1000 assigns the De-Identification Object Attribute 532 to the HIPAA Containment Policy Class 560. At 1015, method 1000 assigns all appropriate Objects to the cross-containment Object Attribute. For example, method 1000 assigns a De-Identification Object 530 to the De-Identification Object Attribute 532.

At 1020, method 1000 creates a cross-containment User Attribute. For example, method 1000 creates the De-Identification HIPAA User Attribute 540. At 1025, method 1000 assigns the users to the cross-containment User Attribute that are allowed to transfer Objects out of the containment area. For example, method 1000 assigns the User 401 to the De-Identification HIPAA User Attribute 540, as the User 401 is allowed to transfer Objects outside of the containment area. At 1030, method 1000 assigns, directly or indirectly, the cross-containment User Attribute to the Policy Class. For example, method 1000 assigns the De-Identification HIPAA User Attribute 540 to the HIPAA Containment Policy Class 560 via the All Purposes Attribute 550.

At 1035, method 1000 associates the appropriate right from the cross-containment User Attribute to the Object Attributes. For example, method 1000 associates the read (r) right from the De-Identification HIPAA User Attribute 540 to the HIPAA Object Attribute 534, and the create (c), read (r), update (u), and delete (d) rights from the De-Identification HIPAA User Attribute 540 to the De-Identification Object Attribute 532.

At 1040, method 1000 amends the Obligation so that if an Object that has a path to the Object Attribute has been accessed with rights that required containment, then prohibit the user from requesting certain rights on Objects that are not part of that containment Object Attribute nor the cross-containment Object Attribute. For example, method 1000 amends the Obligation 570 so that if an Object that has a path to the HIPAA Object Attribute 534 has been accessed with rights that required containment, such as read rights, then prohibit the User 401 from requesting certain rights (i.e., c, u, d) on Objects that are not part of the HIPAA Object Attribute 534 nor the cross-containment De-Identification Object Attribute 532. Method 1000 then returns.

FIG. 11 shows a high-level diagram illustrating example assignments and actions for instrument-based access control 1100 according to an embodiment. Instrument-based access control 1100 documents the user-instrument assignments, object-instrument assignments, and user-object associations for actions. According to instrument-based access control 1100, a user 1105 initiates or submits a request 1110 for access to an object 1115 with an intended purpose 1120 which may be explicitly or implicitly indicated in the request 1110. The user 1105 may or may not be granted access to the object 1115 according to the purpose 1120.

The constraint model provided herein provides significant value over standard NGAC in several ways, which may be demonstrated by considering how the model grows when the only change is more users with the same access. FIGS. 12 and 13 illustrate the difference in access control according to the techniques of the present disclosure with access control in the absence of a constraint model. In particular, FIG. 12 shows a high-level diagram illustrating an example of access control 1200 for multiple users with a constraint module according to an embodiment, while FIG. 13 shows a high-level diagram illustrating an example of access control 1300 for multiple users without constraints.

Access control 1200 depicts a first user 1201 and a second user 1202. The first user 1201 and the second user 1202 are associated to the instrument control point attribute 1240, and thus to the instrument 1260. The first user 1201 and the second user 1202 are further associated with constraints 1210 for accessing the Medical Data object 1220. The constraints 1210 include a Financial Attributes constraint 1211, a Self constraint 1213, a Medical Attributes constraint 1215, and a Minors constraint 1217. The users may be associated with different constraints depending on the user. For example, the first user 1201 may be provided read (r) access to the Financial Attributes constraint 1211, while the second user 1202 may be provided read (r) access to both the Self constraint 1213 and the Medical Attributes constraint 1215. Both the Self constraint 1213 and the Medical Attributes constraint 1215 may be linked to the Minors constraint 1217, which may also have direct read access by the Instrument Control Point attribute 1240. In this way, access to the Medical Data object 1220 by the first user 1201 is mediated by the Financial Attributes constraint 1211, while access to the Medical Data object 1220 by the second user 1202 is mediated by the Self constraint 1213, the Medical Attributes constraint 1215, and the Minors constraint 1217. The Medical Data object 1220 is further associated with the Instrument Control Point object attribute 1250, which is connected to the Instrument policy class 1260. Thus access to the Medical Data object 1220 for different users may be managed by managing a set of constraints 1210.

FIG. 13 shows a high-level diagram illustrating an example of access control 1300 for multiple users with next generation access control but without use of a constraint model. In particular, access control 1300 depicts a scheme for facilitating access to a Medical Data object 1320 by a first user 1301 and a second user 1302 without use of constraints. The first user 1301 and the second user 1302 are associated with the Instrument Control Point attribute 1340 for the Instrument policy class 1360. The first user 1301 is given read (r) rights for Financial Attributes object 1311 for financial attributes 1310 for the first user 1301. The second user 1302 is given read (r) rights for medical attributes 1312, specifically for a Medical Attributes object 1313 and a Not Minors object 1315, as well as read (r) rights for self attributes 1316 configured with a Self object 1317 and a Not Minor object 1319. The Financial Attributes object 1311, the Not Minors object 1315, and the Not Minors object 1319 are linked to the Medical Data object 1320, which is connected to the Instrument Control Point object attribute 1350 and thus to the Instrument policy class 1360.

While access control 1300 may only appear to be a slight variation on access control 1200, the difference in managing a plurality of users is staggering. For example, in the depicted examples, there are two relatively simple access paths that need to be associated with an increasing number of users. For 100,000 users, the access control 1300 necessitates the maintenance of 364% more items in comparison to the access control 1200, including maintaining almost 500,000 duplicates in sync if the constraint logic ever changes. The constraint model depicted in the access control 1200 only increases the number of associations linearly with the increase of the number of users. Meanwhile, for access control 1300, the number of associations grows similarly but the number of objects increases linearly with the increase of the number of users as well, as they have to be explicitly defined instead of dynamically generated. This results in a similar increase in the number of assignments to the Medical Data object 1320 in comparison to the number of assignments to the Medical Data object 1220. This explicit declaration for access control 1300 means that the constraint logic is now duplicated for each object created to satisfy access control for a given user, leading to 499,996 copies of logic that have to be kept in sync. In this example, the constraint model of access control 1200 always has one more association than the access control 1300, for the same number of users, because the access control 1200 needs to prohibit the access to Minor data as an instrument association. The constraint model of access control 1200 is declarative, in that it exposes the logic underlying instruments and allows the logic to be stated once. If a new instrument requires mandated access to Minors only, for example, the constraint model of access control 1200 would add a positive association from the relevant users to the same constraint for the new instrument. In contrast, the access control 1300 would require an explicit object per user, where the constraint logic is again duplicated, but this time not negated, effectively creating a new type of logic duplication. Further, the access control 1300 has no explicit knowledge that the Minor prohibition is mandated by which Instrument, if multiple Instruments are assigned to the (Medical Data) object 1320, for example.

In addition, the constraint model of access control 1200 may re-use the constraints should there be a common definition across instruments, such as state laws referencing federal laws, which is seen in the case of state law (e.g., California Consumer Privacy Act) exempting covered entities if they already adhere to the Health Insurance Portability and Accountability Act (HIPAA).

As another example of the improvement of the present disclosure over previous access control systems, FIG. 14 shows a high-level diagram illustrating an example of access control 1400 with virtual users according to an embodiment. Access control 1400 depicts an example of access control for a user 1401 with respect to Medical Data object 1420 in view of an Instrument policy class 1460, where the user 1401 is associated with an Instrument Control Point user attribute 1440 while the Medical Data object 1420 is associated with an Instrument Control Point object attribute 1450 for the Instrument policy class 1460, as depicted.

The access control 1400 includes the concept of user constraints, such as the Business Hours user constraint 1403 and the Production Issue user constraint 1405. Such user constraints allow for environmental conditions to be applied to the access control 1400. In the depicted example, the user 1401 accessing the Medical Data object 1420 is split into two virtual users: one virtual user that is allowed access during business hours as facilitated by the Business Hours user constraint 1403, and a second virtual user that is allowed access when there is a production issue as facilitated by the Production Issue user constraint 1405. Access is allowed when either or both virtual users are allowed.

Thus, systems and methods for purpose-based access control are provided. In one embodiment, a method comprises for determining access to an asset comprises receiving, from a user, an access request for the asset, the access request specifying a purpose for accessing the asset, and authorizing access to the asset if the purpose is approvingly linked to the asset.

In a first example of the method, a legal instrument is configured as a policy class with constraints on accessing resources including the asset, and the method further comprises, responsive to receiving the access request, tracing paths through constraints assigned to the user and to the asset. In a second example of the method optionally including the first example, authorizing access to the asset if the purpose is approvingly linked to the asset comprises determining that the paths do not include a prohibition to access the asset, and granting access to the asset. In a third example of the method optionally including one or more of the first and second examples, authorizing access to the asset if the purpose is approvingly linked to the asset comprises determining a path that includes an approval, generating a virtual object based on the asset with all constraints in the approved path applied to the asset, and granting access to the virtual object. In a fourth example of the method optionally including one or more of the first through third examples, the legal instrument comprises a reference to a document that allows or denies a single legally enforceable act, process, duty, obligation, or right. In a fifth example of the method optionally including one or more of the first through fourth examples, the legal instrument comprises one or more of Medicare rules, HIPAA privacy rules, and data-use restrictions. In a sixth example of the method optionally including one or more of the first through fifth examples, maintenance of the legal instrument via the policy class and the constraints and maintenance of the assignments between the user and the asset are maintained by separate custodians. In a seventh example of the method optionally including one or more of the first through sixth examples, the constraints comprise environmental constraints relating to one or more of a time of the access request and a geographic location of the access request. In an eighth example of the method optionally including one or more of the first through seventh examples, the method further comprises modifying authorization of the access to the asset responsive to receiving a denial or approval of consent from a subject associated with the asset. In a ninth example of the method optionally including one or more of the first through eighth examples of the method, the method further comprises determining whether the user is approved for the purpose, and denying access to the asset if the user is not approved for the purpose. In a tenth example of the method optionally including one or more of the first through ninth examples, authorizing access to the asset if the purpose is approvingly linked to the asset comprises evaluating a directed acyclic graph to determine whether a positive path from the purpose to the asset is present, and authorizing access responsive to the positive path. In an eleventh example of the method optionally including one or more of the first through tenth examples, the method further comprises, responsive to the access request not specifying the purpose, automatically determining an intended purpose based on the access request, and updating the access request with the intended purpose.

In another embodiment, a system, comprises a logic subsystem, and a data-holding subsystem storing executable instructions that when executed cause the logic subsystem to: receive, from a user, an access request for an asset, the access request specifying a purpose for accessing the asset; and authorize access to the asset if the purpose is approvingly linked to the asset.

In a first example of the system, a legal instrument is configured as a policy class with constraints on accessing resources including the asset, and the instructions further cause the logic subsystem to, responsive to receiving the access request, trace paths through constraints assigned to the user and to the asset. In a second example of the system optionally including the first example, to authorize access to the asset if the purpose is approvingly linked to the asset, the instructions further cause the logic subsystem to determine that the paths do not include a prohibition to access the asset, and grant access to the asset. In a third example of the system optionally including one or more of the first and second examples, to authorize access to the asset if the purpose is approvingly linked to the asset, the instructions further cause the logic subsystem to determine a path that includes an approval, generate a virtual object based on the asset with all constraints in the approved path applied to the asset, and grant access to the virtual object. In a fourth example of the system optionally including one or more of the first through third examples, the instructions further cause the logic subsystem to modify authorization of the access to the asset responsive to receiving a denial or approval of consent from a subject associated with the asset. In a fifth example of the system optionally including one or more of the first through fourth examples, the instructions further cause the logic subsystem to determine whether the user is approved for the purpose, and deny access to the asset if the user is not approved for the purpose. In a sixth example of the system optionally including one or more of the first through fifth examples, the instructions further cause the logic subsystem to evaluate a directed acyclic graph to determine whether a positive path from the purpose to the asset is present, and authorize access responsive to the positive path. In a seventh example of the system optionally including one or more of the first through sixth examples, the instructions further cause the logic subsystem to authorize access to a risk-reduced asset corresponding to the asset responsive to a legal use constraining access to the asset for the purpose.

In another representation, a system comprises a logic subsystem, and a data-holding subsystem storing executable instructions that when executed cause the logic subsystem to: receive, from a user, an access request for an asset, the access request specifying a purpose for accessing the asset; and authorize access to the asset if the purpose is approvingly linked to the asset.

In a first example of the system, the instructions further cause the logic subsystem to: identify a legal use linked to the purpose; determine that the legal use is approved for the purpose; identify an instrument linked to the legal use; determine that the instrument is approved for the legal use; and grant access to the asset responsive to the asset linked to the instrument. In a second example of the system optionally including the first example, the instructions further cause the logic subsystem to deny access to the asset responsive to identifying a legal use or instrument linked to the asset and explicitly denied for the purpose. In a third example of the system optionally including one or more of the first and second examples, links between the legal use to the purpose, the instrument to the purpose, and the asset to the instrument are maintained by separate custodians. In a fourth example of the system optionally including one or more of the first through third examples, the instructions further cause the logic subsystem to modify authorization of the access to the asset responsive to receiving a denial or approval of consent from a subject associated with the asset. In a fifth example of the system optionally including one or more of the first through fourth examples, the instructions further cause the logic subsystem to evaluate a re-identification threshold for the purpose and the user, and deny the user access to the asset if the re-identification threshold is below a minimum-necessary re-identification threshold of the purpose. In a sixth example of the system optionally including one or more of the first through fifth examples, the instructions further cause the logic subsystem to determine whether the user is approved for the purpose, and deny access to the asset if the user is not approved for the purpose. In a seventh example of the system optionally including one or more of the first through sixth examples, the instructions further cause the logic subsystem to evaluate a directed acyclic graph to determine whether a positive path from the purpose to the asset is present, and authorize access responsive to the positive path. In an eighth example of the system optionally including one or more of the first through seventh examples, the instructions further cause the logic subsystem to authorize access to a risk-reduced asset corresponding to the asset responsive to a legal use constraining access to the asset for the purpose.

It will be appreciated that the configurations and routines disclosed herein are exemplary in nature, and that these specific embodiments are not to be considered in a limiting sense, because numerous variations are possible. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application.

Such claims, whether broader, narrower, equal, or different in scope to the original claims, are also regarded as included within the subject matter of the present disclosure.

The invention claimed is:

1. A method for determining access to an asset, comprising:
   receiving, from a user and an access request application program interface (API) in an access control module that is stored in a data-holding subsystem and is executed by a logic subsystem, an access request for the asset, the access request specifying a purpose for accessing the asset;
   at an access control engine in the access control module, authorizing access to the asset if the purpose is approvingly linked to the asset; and
   responsive to receiving the access request, tracing paths through a plurality of constraints that are assigned to the user and to the asset;
   wherein a legal instrument is configured as a policy class that includes the plurality of constraints which limit access to resources which include the asset;
   wherein the plurality of constraints include a financial attribute constraint, a self constraint, a medical attribute constraint, and a minors constraint;
   wherein the access control engine includes a policy information point (PIP) that stores data structures that define the policy class and the relationships between the policy class and the plurality of constraints;
   wherein the access is authorized if the user has a re-identification threshold that is equal to or greater than a re-identification threshold for the purpose;
   wherein the re-identification thresholds for the user and the purpose correspond to re-identification scores that are not acceptable;
   wherein the re-identification score is a value that is calculated based on how likely it is that a subject can be re-identified from the asset;
   wherein the purpose is assigned to a Health Insurance Portability and Accountability Act (HIPAA) containment policy class that include the plurality of constraints which limit access to resources which include the asset;
   wherein a HIPAA object attribute is assigned to the HIPAA containment policy class and represents a containment instrument; and
   wherein the HIPAA containment policy class is configured to restrict access to HIPAA data; and
   responsive to receiving the access request, tracing paths through a plurality of constraints that are assigned to the user and to the asset based on the HIPAA containment policy class; and
   responsive to the asset having a path to the HIPAA object attribute, prohibiting the user from requesting selected rights on assets that are not part of the HIPAA object attribute; and
   wherein the selected rights include a create right, an update right, and a delete right.

2. The method of claim 1, wherein authorizing access to the asset if the purpose is approvingly linked to the asset comprises determining that the paths do not include a prohibition to access the asset, and granting access to the asset.

3. The method of claim 1, wherein authorizing access to the asset if the purpose is approvingly linked to the asset comprises determining a path that includes an approval, generating a medical data object based on the asset with all of the plurality of constraints in the approved path applied to the asset, and granting access to the medical data object.

4. The method of claim 1, wherein maintenance of the legal instrument via the policy class and the plurality of constraints and maintenance of the assignments between the user and the asset are maintained by separate custodians.

5. The method of claim 1, further comprising modifying authorization of the access to the asset responsive to receiving a denial or approval of consent from a subject associated with the asset.

6. The method of claim 1, further comprising determining whether the user is approved for the purpose, and denying access to the asset if the user is not approved for the purpose.

7. The method of claim 1, wherein authorizing access to the asset if the purpose is approvingly linked to the asset comprises evaluating a directed acyclic graph to determine whether a positive path from the purpose to the asset is present, and authorizing access responsive to the positive path.

8. The method of claim 1, further comprising, responsive to the access request not specifying the purpose, automatically determining an intended purpose based on the access request, and updating the access request with the intended purpose.

9. A system, comprising:
   a logic subsystem; and
   a data-holding subsystem storing executable instructions that when executed cause the logic subsystem to:
   receive, from a user and an access request application program interface (API) in an access control module that is stored in a data-holding subsystem and is executed by a logic subsystem, an access request for the asset, the access request specifying a purpose for accessing the asset;
   at an access control engine in the access control module, authorize access to the asset if the purpose is approvingly linked to the asset; and
   responsive to receiving the access request, trace paths through a plurality of constraints that are assigned to the user and to the asset;

wherein a legal instrument is configured as a policy class that includes the plurality of constraints which limit access to resources which include the asset;

wherein the plurality of constraints include a financial attribute constraint, a self constraint, a medical attribute constraint, and a minors constraint;

wherein the access control engine includes a policy information point (PIP) that stores data structures that define the policy class and the relationships between the policy class and the plurality of constraints;

wherein the access is authorized if the user has a re-identification threshold that is equal to or greater than a re-identification threshold for the purpose;

wherein the re-identification thresholds for the user and the purpose correspond to re-identification scores that are not acceptable;

wherein the re-identification score is a value that is calculated based on how likely it is that a subject can be re-identified from the asset;

wherein the purpose is assigned to a Health Insurance Portability and Accountability Act (HIPAA) containment policy class that include the plurality of constraints which limit access to resources which include the asset;

wherein a HIPAA object attribute is assigned to the HIPAA containment policy class and represents a containment instrument; and wherein the HIPAA containment policy class is configured to restrict access to HIPAA data; and responsive to receiving the access request, trace paths through a plurality of constraints that are assigned to the user and to the asset based on the HIPAA containment policy class; and responsive to the asset having a path to the HIPAA object attribute, prohibiting the user from requesting selected rights on assets that are not part of the HIPAA object attribute; and wherein the selected rights include a create right, an update right, and a delete right.

10. The system of claim 9, wherein, to authorize access to the asset if the purpose is approvingly linked to the asset, the instructions further cause the logic subsystem to determine that the paths do not include a prohibition to access the asset, and grant access to the asset.

11. The system of claim 9, wherein, to authorize access to the asset if the purpose is approvingly linked to the asset, the instructions further cause the logic subsystem to determine a path that includes an approval, generate a virtual object based on the asset with all constraints in the approved path applied to the asset, and grant access to the virtual object.

12. The system of claim 9, wherein the instructions further cause the logic subsystem to modify authorization of the access to the asset responsive to receiving a denial or approval of consent from a subject associated with the asset.

13. The system of claim 9, wherein the instructions further cause the logic subsystem to determine whether the user is approved for the purpose, and deny access to the asset if the user is not approved for the purpose.

14. The system of claim 9, wherein the instructions further cause the logic subsystem to evaluate a directed acyclic graph to determine whether a positive path from the purpose to the asset is present, and authorize access responsive to the positive path.

15. The system of claim 9, wherein the instructions further cause the logic subsystem to authorize access to a risk-reduced object corresponding to the asset responsive to a legal use constraining access to the asset for the purpose.

* * * * *